(12) United States Patent
Moritomo et al.

(10) Patent No.: US 11,054,874 B2
(45) Date of Patent: Jul. 6, 2021

(54) ELECTRONIC DEVICE, METHOD OF CONTROLLING ELECTRONIC DEVICE AND NON-TRANSITORY COMPUTER-READABLE STORAGE MEDIUM

(71) Applicant: CANON KABUSHIKI KAISHA, Tokyo (JP)

(72) Inventors: Hiroshi Moritomo, Tokyo (JP); Tsuyoshi Fujisaki, Tokyo (JP); Kazuya Miyahara, Kawasaki (JP); Yasuhiro Sato, Kawasaki (JP); Tomoya Yamashita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,750

(22) Filed: Jun. 26, 2019

(65) Prior Publication Data
US 2020/0004308 A1 Jan. 2, 2020

(30) Foreign Application Priority Data
Jun. 29, 2018 (JP) .............................. JP2018-125280

(51) Int. Cl.
*G06F 1/26* (2006.01)
*H04N 5/232* (2006.01)
*G06F 1/28* (2006.01)

(52) U.S. Cl.
CPC ................ *G06F 1/266* (2013.01); *G06F 1/28* (2013.01); *H04N 5/23241* (2013.01)

(58) Field of Classification Search
CPC ........ G06F 1/28; G06F 1/266; H04N 5/23241
See application file for complete search history.

(56) References Cited

U.S. PATENT DOCUMENTS

2015/0180221 A1* 6/2015 Leinonen ................. H02H 5/04
361/103
2015/0293514 A1* 10/2015 Tupala ............. G01R 19/16595
700/295
(Continued)

FOREIGN PATENT DOCUMENTS

CN         105375207 A      3/2016
CN         106451594 A      2/2017
(Continued)

OTHER PUBLICATIONS

The above foreign patent documents were cited in a Feb. 20, 2021 Chinese Office Action, which is enclosed with an English Translation, that issued in Chinese Patent Application No. 201910586003.0.

*Primary Examiner* — Nimesh G Patel
(74) *Attorney, Agent, or Firm* — Cowan, Liebowitz & Latman, P.C.

(57) ABSTRACT

An electronic device comprises an interface including a first terminal that receives power from an external device and a second terminal for communicating with the external device, and at least one processor and/or at least one circuit to perform the operations of a communication unit that communicates with the external device via the second terminal, and a control unit that controls a connection between the second terminal and a ground, wherein in a case that a state of power received via the first terminal is a predetermined state, the communication unit sends a reset request for stopping the supply of power to the external device, and the control unit controls the connection between the second terminal and the ground from a connected state to a disconnected state.

7 Claims, 17 Drawing Sheets

(56) References Cited

U.S. PATENT DOCUMENTS

| | | | | |
|---|---|---|---|---|
| 2017/0344098 | A1* | 11/2017 | Abu Hilal | G06F 13/4282 |
| 2018/0024899 | A1* | 1/2018 | Degura | G06F 13/00 |
| | | | | 358/520 |
| 2018/0039585 | A1* | 2/2018 | Lambert | G06F 13/385 |
| 2018/0062381 | A1* | 3/2018 | Jarvensivu | H01R 13/6683 |

FOREIGN PATENT DOCUMENTS

| | | |
|---|---|---|
| CN | 106849244 A | 6/2017 |
| CN | 106997097 A | 8/2017 |
| CN | 107783929 A | 3/2018 |
| CN | 107957966 A | 4/2018 |
| JP | 2017-187933 A | 10/2017 |

* cited by examiner

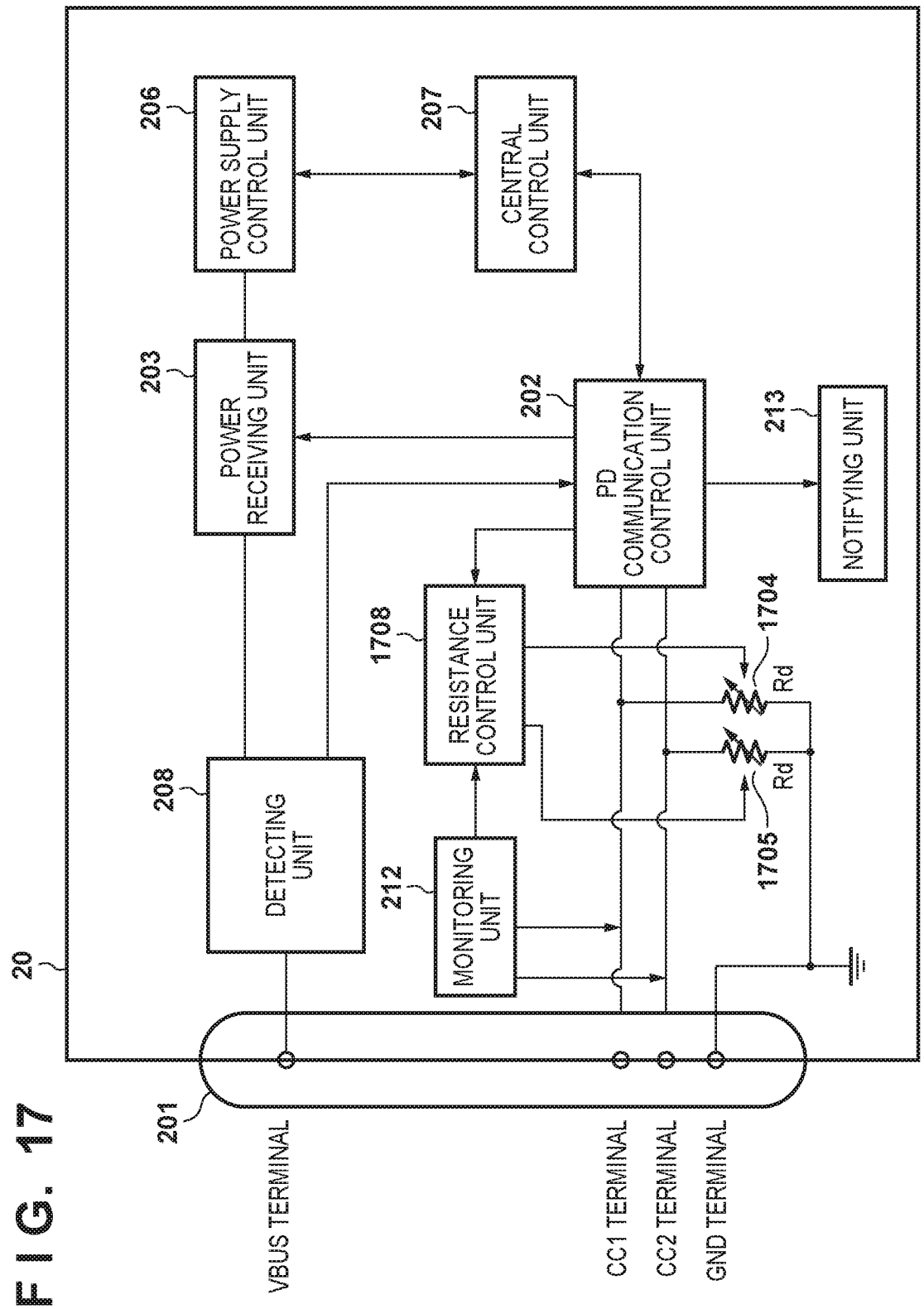

ELECTRONIC DEVICE, METHOD OF CONTROLLING ELECTRONIC DEVICE AND NON-TRANSITORY COMPUTER-READABLE STORAGE MEDIUM

BACKGROUND OF THE INVENTION

Field of the Invention

The present invention relates to an electronic device, a method of controlling electronic device and a non-transitory computer-readable storage medium.

Description of the Related Art

At present, some wired interfaces for communication employ techniques that enable power to be transmitted as data is being transferred, when a connection is made with an electronic device such as a camera. USB (Universal Serial Bus) (registered trademark) is a common example.

A device compliant with USB Power Delivery ("USB-PD" hereinafter) can supply a maximum of 100 W of power over a USB cable, from a power transmission apparatus such as a USB host device or an AC adapter to a power receiving apparatus on the power receiving side. Meanwhile, the development of USB Type-C (registered trademark) has made it possible for large amounts of power to be supplied with a small-sized USB connector, by using the USB-PD standard.

When a power transmission apparatus and a power receiving apparatus compliant with the USB-PD standard are connected, the apparatuses exchange power information through negotiation communication. The power transmission apparatus then supplies the power requested by the power receiving apparatus.

However, the ability to supply a much greater amount of power than was possible with past USB standards has led to demand for the ability to supply power more safely. Thus with the USB-PD standard, the connection partner can be requested to perform a hard reset when the temperature of the connector connected to the cable connecting the device has risen or the supply of power deviates from a normal operating state, as with overcurrent or overvoltage in the power supply.

The USB-PD standard enables operations in which the communication state and power supply under USB-PD are stopped after a hard reset has been requested, and power can be supplied again, and a new communication connection can be made, from the power transmission apparatus within a set amount of time.

The USB-PD standard also has a provision for ensuring that the state does not repeatedly deviate from a normal operating state. However, if, when a hard reset has been requested and the supply of power has been resumed, the state once again deviates from a normal operating state, there are cases where a hard reset is requested again. If the supply of power does not return to the normal operating state, it is possible that the hard reset request, the stopping of the supply of power, and the resuming of the supply of power will occur repeatedly.

In response to such a situation, a technique is known in which an error detection circuit is provided in the power source circuit of a power transmission apparatus. When the detection circuit detects an error, the output of the power source is stopped and a test voltage is output. When the detection circuit detects that the state has recovered from the error state, the output is resumed. Japanese Patent Laid-Open No. 2017-187933 is a document that discloses such a technique.

SUMMARY OF THE INVENTION

According to a first aspect of the present invention, there is provided an electronic device comprising: an interface including a first terminal configured to receive power from an external device and a second terminal configured to communicate with the external device; and at least one processor and/or at least one circuit to perform the operations of the following units: a communication unit that communicates with the external device via the second terminal; and a control unit that controls a connection between the second terminal and a ground, wherein in a case that a state of power received via the first terminal is a predetermined state, the communication unit sends a reset request for stopping the supply of power to the external device and the control unit controls the connection between the second terminal and the ground from a connected state to a disconnected state.

According to a second aspect of the present invention, there is provided an electronic device comprising: an interface including a first terminal configured to receive power from an external device and a second terminal configured to communicate with the external device; and at least one processor and/or at least one circuit to perform the operations of the following units: a communication unit that communicates with the external device via the second terminal; and a control unit that controls a connection between the second terminal and a ground, wherein the communication unit starts communication with the external device via the second terminal in accordance with a voltage level of the second terminal transitioning to a predetermined range in response to the electronic device being connected with the external device; and wherein in a case that a state of power received via the first terminal is a predetermined state, the control unit controls the voltage level of the second terminal to a voltage level outside the predetermined range.

According to a third aspect of the present invention, there is provided a method of controlling an electronic device, wherein the electronic device comprises: an interface including a first terminal configured to receive power from an external device and a second terminal configured to communicate with the external device; and the method comprises: communicating with the external device via the second terminal; and controlling a connection between the second terminal and a ground, and wherein in the communicating, in a case that a state of power received via the first terminal is a predetermined state, a reset request for stopping the supply of power is sent to the external device; and in the controlling, the connection between the second terminal and the ground is controlled from a connected state to a disconnected state.

According to a fourth aspect of the present invention, there is provided a method of controlling an electronic device, wherein the electronic device comprises: an interface including a first terminal configured to receive power from an external device and a second terminal configured to communicate with the external device; and the method comprises: communicating with the external device via the second terminal; and controlling a connection between the second terminal and a ground, and wherein in the communicating, communication with the external device via the second terminal is started in accordance with a voltage level of the second terminal transitioning to a predetermined range in response to the electronic device being connected with the external device; and in the controlling, the voltage level of the second terminal is controlled to a voltage level outside the predetermined range in a case that a state of power received via the first terminal is a predetermined state.

According to a fifth aspect of the present invention, there is provided a non-transitory computer-readable storage medium storing a program which, when read and executed by a processor in an electric device including an interface having a first terminal for receiving power from an external device and a second terminal for communicating with the external device, causes the computer to execute the steps of a method comprising: communicating with the external device via the second terminal; and controlling a connection between the second terminal and a ground, and wherein in the communicating, in a case that a state of power received via the first terminal is a predetermined state, a reset request for stopping the supply of power is sent to the external device; and in the controlling, the connection between the second terminal and the ground is controlled from a connected state to a disconnected state.

According to a sixth aspect of the present invention, there is provided a non-transitory computer-readable storage medium storing a program which, when read and executed by a processor in an electric device including an interface having a first terminal configured to receive power from an external device and a second terminal configured to communicate with the external device, causes the computer to execute the steps of a method comprising: communicating with the external device via the second terminal; and controlling a connection between the second terminal and a ground, and wherein in the communicating, communication with the external device via the second terminal is started in accordance with a voltage level of the second terminal transitioning to a predetermined range in response to an electronic device being connected with the external device; and in the controlling, the voltage level of the second terminal is controlled to a voltage level outside the predetermined range in a case that a state of power received via the first terminal is a predetermined state.

According to the present invention, when a power transmission apparatus and a power receiving apparatus have deviated from a normal operating state, it is possible to maintain a safe stopped state, as well as suppress the occurrence of a situation where the state repeatedly deviates from a normal operating state.

Further features of the present invention will become apparent from the following description of exemplary embodiments (with reference to the attached drawings).

BRIEF DESCRIPTION OF THE DRAWINGS

FIG. 17 is another block diagram illustrating the power receiving apparatus according to the fifth embodiment.

DESCRIPTION OF THE EMBODIMENTS

Figure 1:
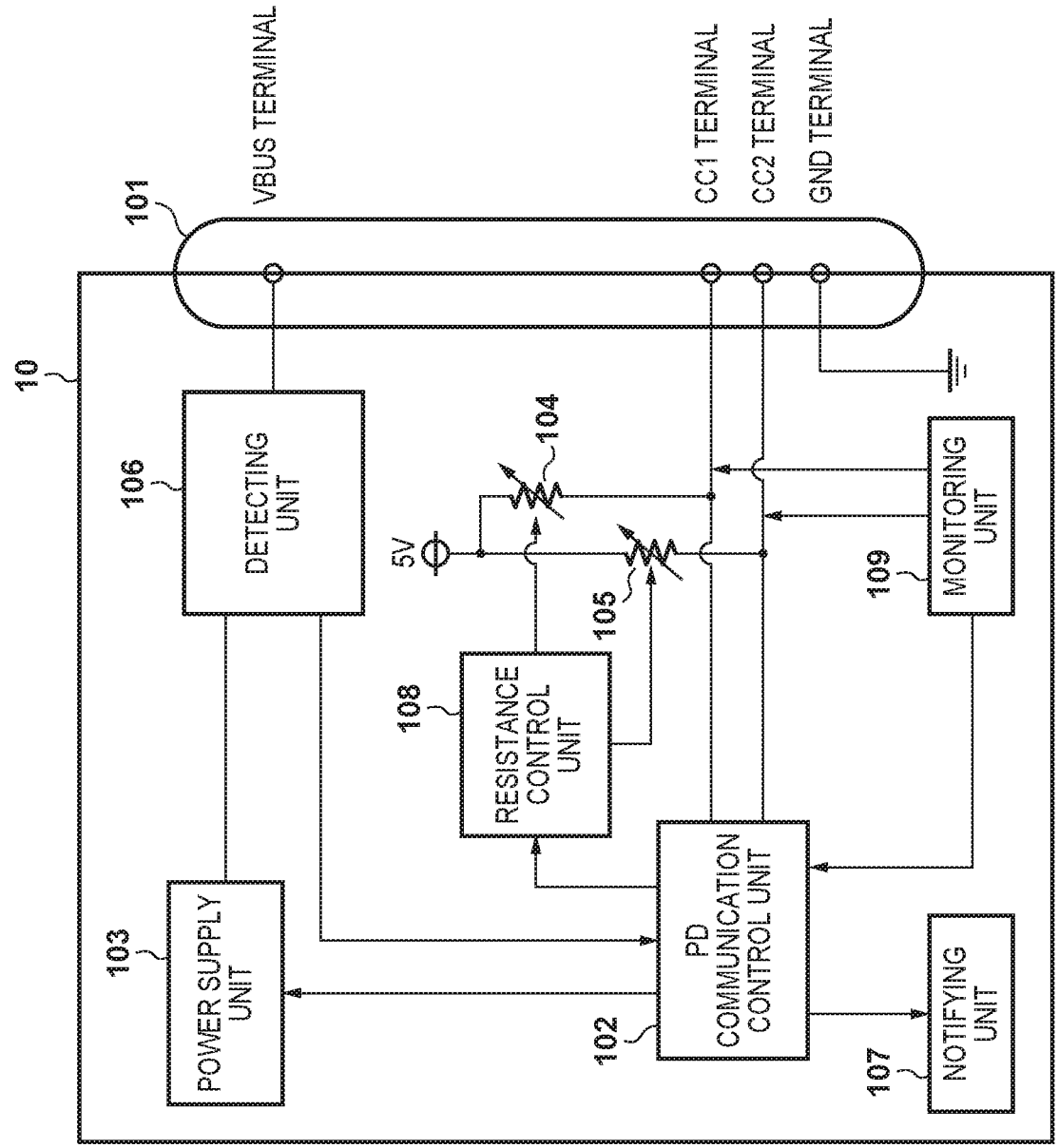
FIG. 1 is a block diagram illustrating a power transmission apparatus according to a first embodiment.

Hereinafter, embodiments of the present invention will be described in detail with reference to the appended drawings. It should be noted that the configurations described in the following embodiments are merely examples, and that the present invention is not intended to be limited to the configurations illustrated in the drawings. The electronic devices described in the following embodiments include an apparatus on the power transmission side (a power transmission apparatus) and an apparatus on the power receiving side (a power receiving apparatus). It is assumed that the power transmission apparatus is equipped in an AC adapter that receives a power supply from an AC power supply unit and supplies power to the power receiving apparatus, the power transmission apparatus may be equipped in an information processing apparatus such as a personal computer as well. Furthermore, it is assumed that the power receiving apparatus is equipped in an image capturing apparatus, as represented by a digital camera, which holds a secondary battery.

Figure 16:
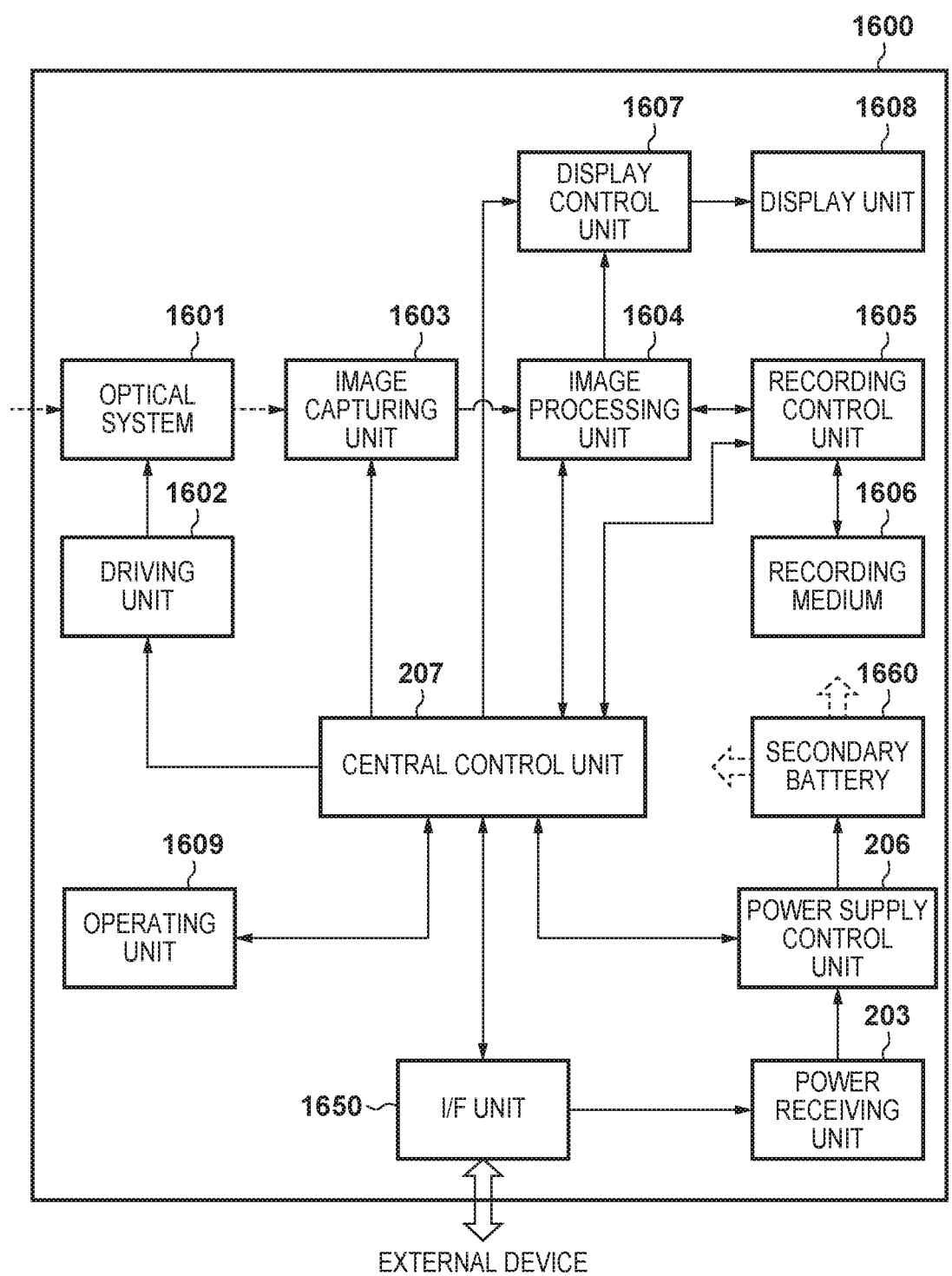
FIG. 16 is a block diagram illustrating an image capturing apparatus equipped with the power receiving apparatus according to an embodiment.

FIG. 16 is a block diagram illustrating an image capturing apparatus 1600. The image capturing apparatus 1600 includes a central control unit 207 that controls the apparatus as a whole. The central control unit 207 is constituted by a CPU, ROM that stores programs executed by the CPU, and RAM used as a work area for the CPU and for expanding programs to be executed. The image capturing apparatus 1600 includes an optical system 1601, a driving unit 1602, an image capturing unit 1603, an image processing unit 1604, a recording control unit 1605, a recording medium 1606, a display control unit 1607, a display unit 1608, an operating unit 1609, an I/F unit 1650, a secondary battery 1660, a power receiving unit 203, and a power supply control unit 206. The optical system 1601 includes a focusing lens, a zoom lens, a stop, and the like. The driving unit 1602 is a driving unit that drives the lenses, the stop, and the like under the control of the central control unit 207. The image processing unit 1604 carries out various image processes under the control of the central control unit 207.

Demosaicing, various types of correction processes (white balance processing and the like), encoding/decoding processing, and the like can be given as examples of the image processes. The recording control unit 1605 writes files of captured images to, and reads out such files from, the recording medium 1606, under the control of the central control unit 207. The recording medium 1606 is a non-volatile removable memory card. The display control unit 1607 displays images, menus, and the like in the display unit 1608, under the control of the central control unit 207. The display unit 1608 is constituted by a liquid crystal display device. The operating unit 1609 is constituted by various types of switches, buttons, a touch panel, and the like operated by the user, and also includes a release button. The I/F unit 1650 is a USB Type-C (registered trademark) interface, and is capable not only of communicating with an external device according to that standard, but also of receiving power for charging the secondary battery 1660 from the external device. As such, the power receiving unit 203 and the power supply control unit 206 are provided in the vicinity of the I/F unit 1650.

In the above-described configuration, elements including at least the central control unit 207, a connector included in the I/F unit 1650, the power receiving unit 203, and the power supply control unit 206 are defined as a "power receiving apparatus" in the embodiments described below.

First Embodiment

Operations carried out by a power transmission apparatus and a power receiving apparatus according to a first embodiment will be described next with reference to FIGS. 1 to 4.

Figure 2:
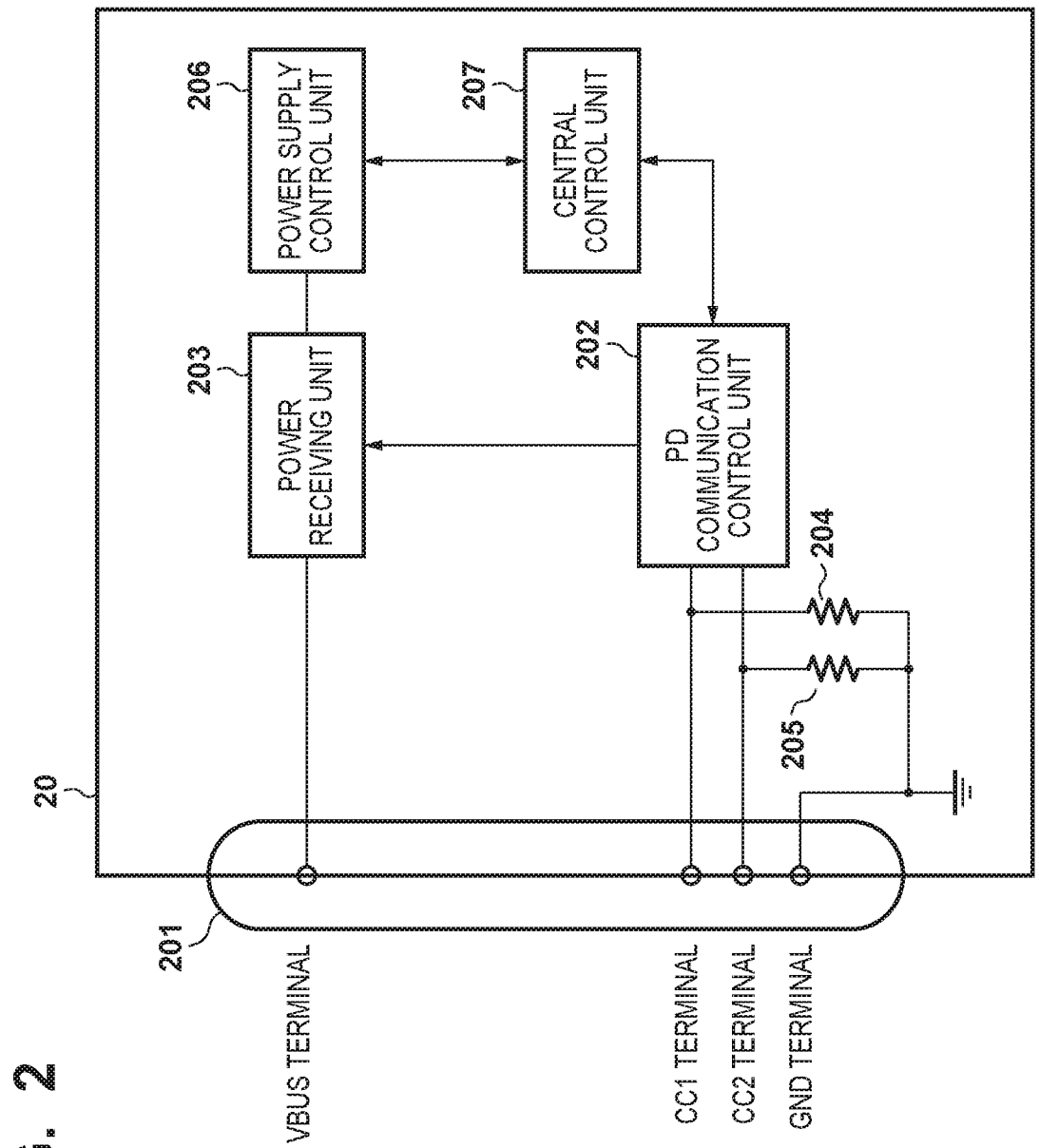
FIG. 2 is a block diagram illustrating a power receiving apparatus according to the first embodiment.
Figure 3:
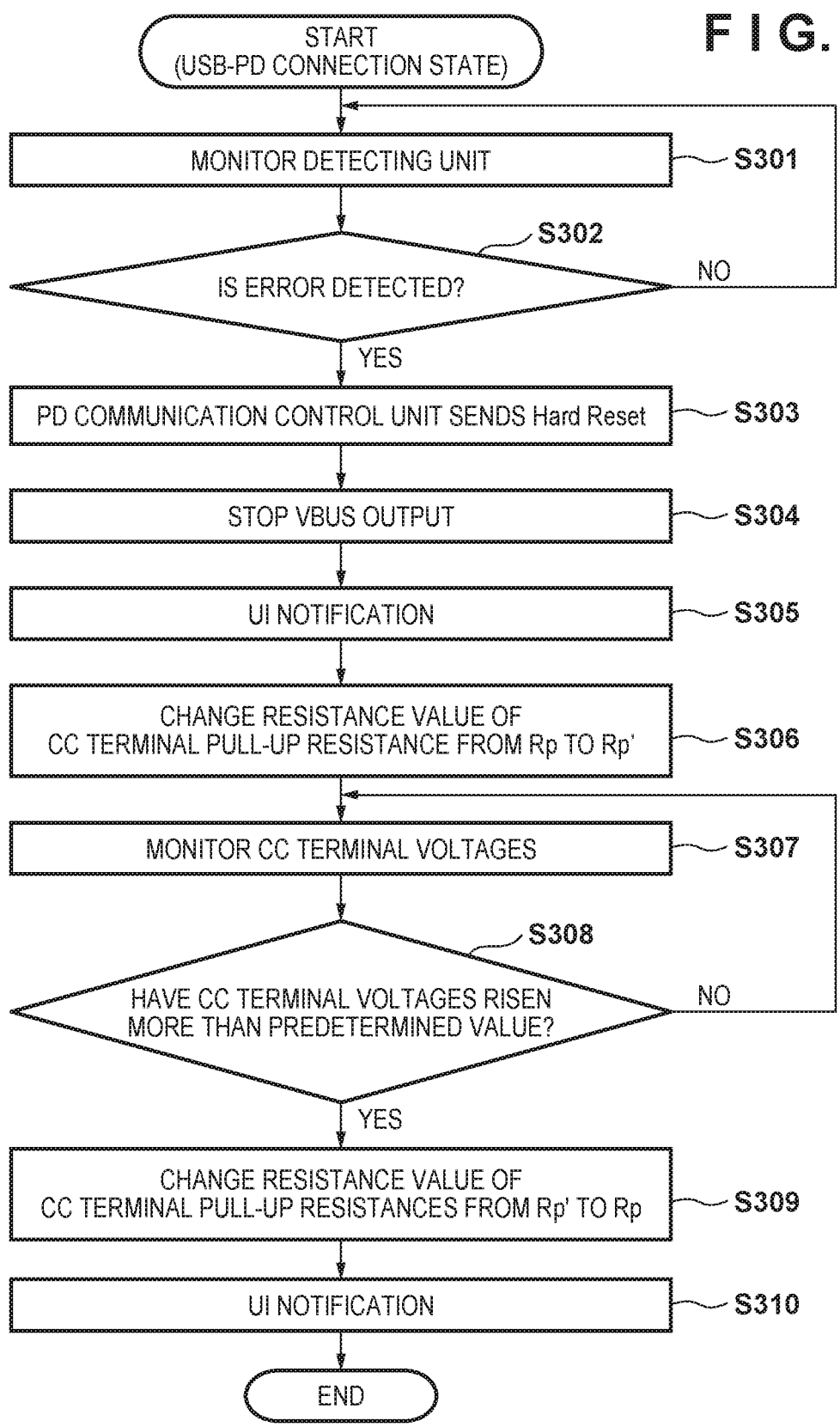
FIG. 3 is a flowchart illustrating a power transmission apparatus-side processing sequence according to the first embodiment.
Figure 4:
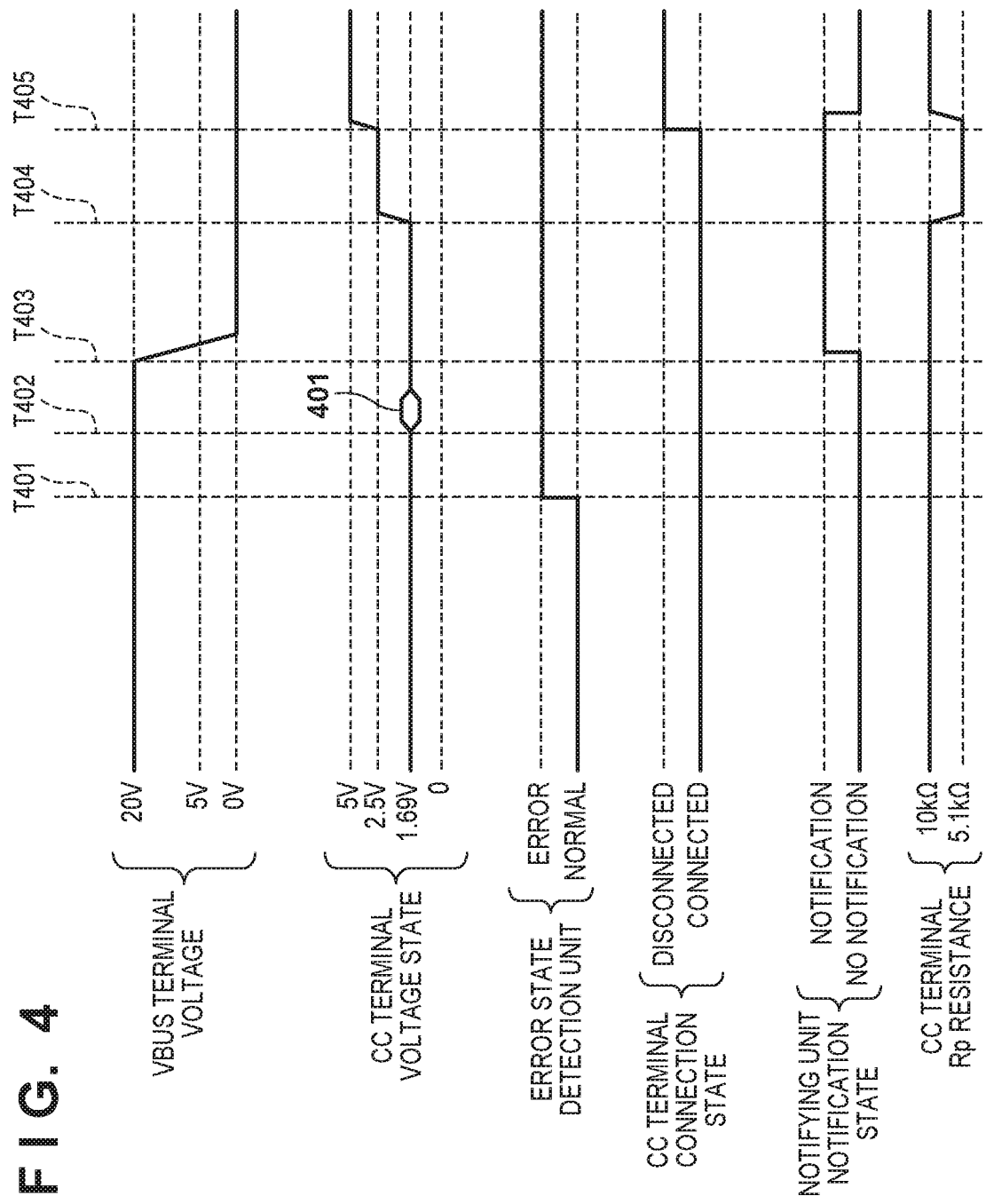
FIG. 4 is a timing chart illustrating operations according to the first embodiment.

FIG. 1 is a block diagram illustrating a power transmission apparatus 10, and FIG. 2 is a block diagram illustrating a power receiving apparatus 20. FIG. 3 is a flowchart illustrating a power transmission apparatus 10-side processing sequence according to the embodiment, and FIG. 4 is a timing chart illustrating the embodiment.

The power transmission apparatus 10 includes a connector 101, a PD communication control unit 102, a power supply unit 103, a first variable resistance element 104, a second variable resistance element 105, a detecting unit 106, a notifying unit 107, a resistance control unit 108, and a monitoring unit 109.

The connector 101 is a connector compliant with the USB Type-C standard. Accordingly, the connector 101 includes terminals such as a VBUS terminal for supplying power, a CC1 terminal and a CC2 terminal used for detecting connections and communicating between devices, a D+ terminal and a D− terminal used for USB 2.0 communication, and a GND terminal. Because the present embodiment relates primarily to transmitting/receiving power as opposed to the communication of information between devices, it should be noted that signal lines of no direct relation to transmitting/receiving power, such as D+ and D−, will not be described.

The PD communication control unit 102 is configured to be capable of detecting a connection with an external device using the CC1 terminal and the CC2 terminal, and communicating with the external device on the basis of the USB Power Delivery standard ("USB-PD standard" hereinafter). The PD communication control unit 102 includes an error determination unit that, by communicating with the external device, detects that a warning notification has been received, and determines whether the state of the external device is a normal state or an error state on the basis of the details of the warning notification.

The power supply unit 103 can supply power to the VBUS terminal, output power necessary for the PD communication control unit 102 to operate, and the like, and is configured to be capable of outputting a predetermined voltage on the basis of an instruction from the PD communication control unit 102. The power supply unit 103 is a power supply unit configured to be capable of power conversion, for converting AC power obtained from an AC outlet (not shown) and outputting a DC constant voltage, and is capable of outputting 5 V power for supplied to the VBUS terminal, for example. It is assumed that power is supplied from the power supply unit 103 to the PD communication control unit 102 and peripheral circuits that can be controlled by the PD communication control unit 102, regardless of the state of power supplied to the VBUS terminal.

The first variable resistance element 104 is a resistance element, which has a variable resistance value, that pulls up the CC1 terminal to a predetermined internal power source. The second variable resistance element 105 is a resistance element for pulling the CC2 terminal up to a predetermined power source, and like the first variable resistance element 104, has a variable resistance value. Each variable resistance element is connected at one end to a power source supplying a predetermined voltage (5 V) and at the other end to the corresponding CC terminal. In response to control signals from the resistance control unit 108, the first variable resistance element 104 and the second variable resistance element 105 can change from a predetermined resistance value Rp to a resistance value Rp' that is different from the predetermined resistance value. In other words, each variable resistance element is switching means for switching a state of connection between the corresponding CC terminal and the power source by changing the resistance value. For example, the first variable resistance element 104 and the second variable resistance element 105 can be constituted by a plurality of resistance elements and switching elements, and can be realized by the switching elements switching between conductive and non-conductive states. Note that the resistance elements can also be realized using semiconductor elements such as transistors. Note that the first variable resistance element 104 and the second variable resistance element 105 are assumed to maintain the predetermined resistance value Rp when not receiving a signal instructing the resistance value to be changed. A resistance value appropriate for the USB Type-C standard may be used as the predetermined resistance value Rp. The first variable resistance element 104 and the second variable resistance element 105 are used both to detect a connected external device and to present the power that can be supplied to the power receiving apparatus connected to the power transmission apparatus 10. The first variable resistance element 104 and the second variable resistance element 105 are for pulling up the terminal voltages at the CC1 terminal and the CC2 terminal to a predetermined power source, regardless of the output state of VBUS. The "predetermined power source" is, for example, a 5 V constant voltage source. According to the USB Type-C standard, if, for example, the device is capable of supplying power of 5 V at 3 A, the first variable resistance element 104 and the second variable resistance element 105 can indicate that 5 V at 3 A can be supplied to the power receiving apparatus by pulling up at 10 kΩ with respect to the 5 V power source. By monitoring the voltages at the CC1 terminal and the CC2 terminal, the PD communication control unit 102 can detect that a power receiving apparatus to which power is to be supplied has been connected. According to the USB Type-C standard, the power receiving apparatus-side CC1 terminal and CC2 terminal connected to the power transmission apparatus 10 are pulled down to ground (GND; ground potential) via 5.1 kΩ resistance elements (resistance elements 204 and 205 illustrated in FIG. 2). A power receiving apparatus which does not supply power to an external apparatus does not need to present the suppliable power, and thus the value of a pull-down resistance Rd is set uniquely. The power receiving apparatus 20 according to the present embodiment will be described in detail later with reference to FIG. 2. As one example, if the power receiving apparatus 20 is connected, and the first variable resistance element 104 and the second variable resistance element 105 are pulled up to the 5 V power source at 10 kΩ, a voltage divided to 1.69 V by the CC1 terminal and the CC2 terminal is applied to the PD communication control unit 102. According to the USB Type-C standard, a power transmission apparatus capable of supplying 5 V at 3 A determines that a power receiving apparatus has been connected when the terminal voltage at either the CC1 terminal or the CC2 terminal is within a range of from 0.85 V to 2.45 V. and instructs the power supply unit 103 to start the output of VBUS.

The detecting unit 106 is configured to be capable of detecting an error when the output state of the VBUS power, output by the power transmission apparatus 10, is in a state of overvoltage or of overcurrent, when the temperature near the connector 101 has exceeded a predetermined threshold, and so on. For example, the detecting unit 106 may be constituted by a detection resistor or an instrument amplifier so as to be capable of detecting an overcurrent state for VBUS; by a temperature detecting, element such as a thermistor, so as to be capable of detecting a temperature; or as an AD converter or the like, so as to be capable of detecting overvoltage for VBUS.

The PD communication control unit 102 monitors a signal from the detecting unit 106 indicating the detection result. In response to a signal indicating an error state being received from the detecting unit 106, the PD communication control unit 102 can instruct the power supply unit 103 to stop its output, make various types of notifications to the power receiving apparatus connected to the power transmission apparatus 10 by using the CC1 terminal and the CC2 terminal, and so on.

The notifying unit 107 is configured to be capable of notifying a user, who is using the power transmission apparatus 10, of the state of the power transmission apparatus 10. For example, if the notifying unit 107 includes a light-emitting element such as a light-emitting diode, an operating/non-operating state can be represented visually by lighting and extinguishing the light-emitting element, and a state different from both the operating/non-operating states can be represented by flashing the light-emitting element. The notifying means of the notifying unit 107 is not limited to a light-emitting diode, and may be any means capable of notifying the user. For example, the notifying unit 107 may have an audio configuration using a speaker, an electronic buzzer, or the like, a video configuration that uses text, images, and the like through a display device such as a screen, or a combination thereof.

The resistance control unit 108 changes the resistance values of the first variable resistance element 104 and the second variable resistance element 105 from Rp to Rp', or vice versa, on the basis of control signals from the PD communication control unit 102. For example, if the power transmission apparatus 10 is an apparatus that transmits power of 5 V at 3 A through the USB Type-C standard, the resistance control unit 108 can switch the first variable resistance element 104 and the second variable resistance element 105 between 10 kΩ, which is suited to the standard, and a different resistance value.

The monitoring unit 109 monitors the voltage values at the CC1 terminal and the CC2 terminal. The monitoring unit 109 is constituted by an A/D converter, a comparator, and the like, for example, and communicates information indicating whether or not the voltage value at one of the CC1 terminal and the CC2 terminal is within a predetermined voltage range to the PD communication control unit 102. Note that the monitoring unit 109 may communicate the voltage values at the CC1 terminal and the CC2 terminal to the PD communication control unit 102. According to the USB Type-C standard, if a power transmission apparatus is capable of supplying 5 V at 3 A, the CC1 terminal and the CC2 terminal are pulled up to a 5 V power source through the resistance elements, and the voltages at the CC1 terminal and the CC2 terminal are at 5 V when a power receiving apparatus is not connected to the connector 101. When a power receiving apparatus is connected to the connector 101, the voltages at the CC1 terminal and the CC2 terminal are within a range of from 0.85 V to 2.45 V. Accordingly, if the power transmission apparatus is capable of supplying 5V at 3 A, one of the CC1 terminal and the CC2 terminal being less than 0.85 V, or in a range greater than 2.45 V but less than 5 V, means that although the power transmission apparatus and the power receiving apparatus are physically connected, the state is not compliant with USB Type-C standard. Thus the power transmission apparatus does not determine that the power receiving apparatus is connected. For example, if the resistance value of the first variable resistance element 104 and the second variable resistance element 105 is set on the basis of an instruction from the resistance control unit 108 so that Rp'=5.1 kΩ, at least one of the CC1 terminal and the CC2 terminal will be at 2.5 V, which is outside the connection determination range of from 0.85 V to 2.45 V.

FIG. 2 is a block diagram illustrating the power receiving apparatus according to the embodiment. The power receiving apparatus 20 includes a connector 201, a PD communication control unit 202, the power receiving unit 203, a first resistance element 204, a second resistance element 205, the power supply control unit 206, and the central control unit 207.

The connector 201 is for connecting the power receiving apparatus 20 to an external device. The connector 201 according to this embodiment is assumed to be a connector compliant with the USB Type-C standard. As such, the connector 201 includes terminals such as a VBUS terminal for receiving power, CC1 and CC2 terminals used for detecting connections and communicating between devices, and a GND terminal.

The PD communication control unit 202 is configured to be capable of detecting a connection with an external device using the CC1 terminal and the CC2 terminal, and communicating with the external device on the basis of the USB-PD standard.

The power receiving unit 203 supplies power, received from the VBUS terminal, so as to be usable within the power receiving apparatus 20. In the USB-PD standard, the power receiving apparatus 20 can receive power over a broad voltage range of from 5 V to 20 V.

The first resistance element 204 has a predetermined resistance value, and pulls the CC1 terminal down to ground (GND) through that predetermined resistance value. The second resistance element 205 has a predetermined resistance value, and like the first resistance element 204, pulls the CC2 terminal down to ground through that predetermined resistance value. The first resistance element 204 and the second resistance element 205 are used to detect a connected device. According to the USB Type-C standard, for example, the first resistance element 204 and the second resistance element 205 have a resistance value of 5.1 kΩ, and the power transmission apparatus 10 can be notified of the power receiving apparatus 20 being connected by the pulling down through those resistances.

The power supply control unit 206 converts power received by the power receiving unit 203 into a voltage that can be used by the power receiving apparatus 20, and supplies the voltage to the various functional units of the power receiving apparatus 20. The central control unit 207 is a central control unit that controls the various operations of the power receiving apparatus 20. For example, if the power receiving apparatus 20 is a digital camera, the central control unit 207 controls an image capturing unit, an image processing circuit, and the like (not shown) using ROM storing programs, RAM used as a work area, and the like. However, this processing is not the main focus of the present invention, and thus details thereof will be omitted here. The power supply control unit 206 is constituted by a DC/DC converter, for example, and is configured to be capable of supplying power required by the central control unit 207. For example, if the power receiving apparatus 20 includes a secondary battery (reference sign 1660 in FIG. 16), the power supply control unit 206 switches to either the secondary battery or the power receiving unit 203 as the power supply source for the central control unit 207, charges the secondary battery, or the like.

Next, a processing sequence carried out by the PD communication control unit 102 of the power transmission apparatus 10 when an error occurs while the power transmission apparatus 10 is supplying power to the power receiving apparatus 20 according to the USB-PD standard will be described using the flowchart of FIG. 3. Note that the following describes a case where the power transmission apparatus 10 and the power receiving apparatus 20 are already in a connected state, and power is transferred according to the USB-PD standard.

In step S301, the PD communication control unit 102 monitors the detecting unit 106. Specifically, the PD communication control unit 102 obtains a signal from the detecting unit 106 to ascertain the state of the detection by the detecting unit 106. In step S302, if the PD communication control unit 102 determines that the signal obtained from the detecting unit 106 indicates a normal state (No in step S302), the process returns to step S301 to continue the monitoring.

If the signal obtained from the detecting unit 106 indicates an error state (Yes in step S302), the PD communication control unit 102 moves the process to step S303. The temperature near the connector 101 rising more than a predetermined value, overvoltage, or overcurrent correspond to the "error state".

In step S303, the PD communication control unit 102 sends a Hard Reset command (reset command) according to the USB-PD standard to the (PD communication control unit 202 of the) power receiving apparatus 20, and moves the process to step S304. In step S304, the PD communication control unit 102 outputs an instruction signal to the power supply unit 103 so as to stop the VBUS output within a predetermined amount of time. According to the USB-PD standard, in the processing from steps S303 to S304, the stopping of the VBUS output may be started within 25 to 35 ms following the Hard Reset instruction.

In step S305, the PD communication control unit 102 outputs a control signal to the notifying unit 107, and notifies the user that an error state has occurred. Next, in step S306, the PD communication control unit 102 controls the resistance control unit 108 to change the resistance value of the first variable resistance element 104 and the second variable resistance element 105 to Rp', which is a resistance value different from Rp as defined by USB Type-C.

The foregoing describes processing where, when an error is determined (Yes in step S302), the PD communication control unit 102 sends the Hard Reset command (step S303) and then changes the pull-up resistance value of the first variable resistance element 104 and the second variable resistance element 105 from Rp to Rp' (step S306) upon the VBUS output stopping (step S304). However, the PD communication control unit 102 may move to step S306 after an error is detected (Yes in step S302).

If the PD communication control unit 102 has changed the pull-up resistance value from Rp to Rp' (step S306), the voltage at least one of the CC1 terminal and the CC2 terminal is outside the connection determination range according to the USB Type-C standard. The PD communication control unit 102 therefore determines that the power receiving apparatus 20 connected to the apparatus including the PD communication control unit 102 has been disconnected, and stops the VBUS output within a prescribed amount of time.

In step S307, the PD communication control unit 102 monitors the voltages at the CC1 terminal and the CC2 terminal via the monitoring unit 109. For example, assume that in step S306, the resistance value of the first variable resistance element 104 and the resistance value of the second variable resistance element 105 have changed from Rp=10 kΩ, defined by USB Type-C, to Rp'=5.1 kΩ. In this case, due to the pull-up power source of 5 V in the power transmission apparatus 10 and the pull-down resistance value of 5.1 kΩ for the resistance elements 204 and 205 of the power receiving apparatus 20, the voltages at the CC1 and CC2 terminals are 2.5 V. According to the USB Type-C standard, when, in the power transmission apparatus 10 which transmits power of 5 V at 3 A, the voltages at the CC1 and CC2 terminals are within a range of from 0.85 V to 2.45 V, the power transmission apparatus 10 determines that the power receiving apparatus 20 is connected. For example, as described earlier, when Rp'=5.1 kΩ, the voltages at the CC1 and CC2 terminals are 2.5 V, which is outside the connection determination range defined by the USB Type-C standard. Thus the power receiving apparatus 20 determines that the power transmission apparatus 10 is not connected. On the other hand, the power transmission apparatus 10 can monitor whether the power receiving apparatus 20 is connected by using the monitoring unit 109.

If the state of physical connection of the power receiving apparatus 20 is being maintained, in step S308, the PD communication control unit 102 determines that the voltages at the CC1 and CC2 terminals are less than the predetermined value (No in step S308), and repeats the transition between steps S307 and S308. Once the power receiving apparatus 20 is physically removed from the power transmission apparatus 10, the pull-down resistances are removed from the CC1 and CC2 terminals of the power transmission apparatus 10 as a result. Accordingly, the voltages at the CC1 and CC2 terminals of the power transmission apparatus 10 rise to the voltages effective when the power receiving apparatus 20 is not connected. The process moves to step S309 upon the PD communication control unit 102 determining that this rise has occurred (Yes in step S308).

In step S309, the PD communication control unit 102 controls the resistance control unit 108 so that the first variable resistance element 104 and the second variable resistance element 105 change from Rp' to the defined resistance value, i.e., Rp, and then moves the process to step S310.

In step S310, the PD communication control unit 102 outputs, to the notifying unit 107, a control signal different from the control signal output to the notifying unit 107 in step S305. For example, if the notifying unit 107 is lighting means such as a light-emitting diode, and the light-emitting diode has been instructed to light in step S305, the PD communication control unit 102 outputs a control signal for extinguishing the light-emitting diode in step S310 so as to notify the user at least that the error state is no longer in effect.

Through the foregoing, the power transmission apparatus 10 can detect that the power receiving apparatus 20, which had been connected, has been removed. In response to detecting that the power receiving apparatus 20 has been removed, the power transmission apparatus 10 returns to a state where a predetermined connection process according to the USB Type-C standard can be started (an unconnected state), and the sequence of operations then ends.

The sequence will be described next using the timing chart in FIG. 4. FIG. 4 is a timing chart illustrating operations from when an error occurs in a state where the power transmission apparatus 10 is connected to the power receiving apparatus 20 and the connection based on the USB-PD standard is complete, to when the VBUS disconnecting process is carried out according to the control illustrated in FIG. 3 and the power receiving apparatus 20 is removed.

The "VBUS terminal voltage" in FIG. 4 indicates the voltage value output to the VBUS terminal of the connector 101 illustrated in FIG. 1, described above. FIG. 4 illustrates a case where, at the point in time when this timing chart starts, a connection based on the USB-PD standard is complete and the VBUS terminal voltage is 20 V.

"CC terminal voltage state" indicates the voltage values of the CC1 terminal and the CC2 terminal of the connector 101 illustrated in FIG. 1. This indicates a state of connection between the power transmission apparatus 10 and the power receiving apparatus 20, where a normal state is 1.69 V, a state in which the control according to the present embodiment is carried out is 2.5 V. and a state where the power receiving apparatus 20 is not connected is 5 V. The voltage values of the CC terminals may be any values compliant with the USB Type-C standard, and are not limited to the voltage values illustrated in FIG. 4.

Timing T401 (the word "timing" will be omitted hereinafter) is a timing at which the detecting unit 106 of the power transmission apparatus 10 detects an error state and notifies the PD communication control unit 102 of the error state, and corresponds to "Yes" in step S302 of FIG. 3.

At T402, the power transmission apparatus 10 sends a Hard Reset command for stopping the USB-PD connection to the power receiving apparatus 20. This is a timing corresponding to step S303 in FIG. 3. Reference sign 401 in FIG. 4 indicates the period in which this Hard Reset command is being sent.

At T403, the power transmission apparatus 10 stops the supply of the VBUS power source after a predetermined amount of time has passed following the sending at T401. This is a timing corresponding to step S304 in FIG. 3. According to the USB-PD standard, the VBUS supply is stopped at 25 to 35 msec after the Hard Reset is sent. Additionally, as indicated by step S305 in FIG. 3, in the present embodiment, the user is notified that an error has occurred after the VBUS output is stopped, and that the VBUS conducting is stopped.

T404 corresponds to step S306 in FIG. 3. At T404, the PD communication control unit 102 controls the resistance control unit 108 so that the pull-up resistance values of the first variable resistance element 104 and the second variable resistance element 105 change from Rp to Rp'. At T404, the CC1 terminal and the CC2 terminal of the connector 101 emit voltages divided by the pull-up resistance value Rp' and the pull-down resistance value Rd. In this embodiment, the pull-up resistance value Rp' is 5.1 kΩ and the pull-down resistance value Pd is 5.1 kΩ, and thus the voltages at the CC1 terminal and the CC2 terminal are 2.5 V. According to the USB Type-C standard, the voltage range required for detecting that the power receiving apparatus 20 has been connected corresponds to the voltages at the CC1 terminal and the CC2 terminal being within a range of from 0.85 V to 2.45 V, and thus the voltage from T404 on is outside the above-described range. If the power receiving apparatus 20 is not connected to the power transmission apparatus 10, there is not voltage division through the pull-down resistance, and thus the voltages at the CC1 terminal and the CC2 terminal remain at the pull-up power source of 5 V. Thus from T404 on, the PD communication control unit 102 can determine whether the power transmission apparatus 10 and the power receiving apparatus 20 are connected, or if the apparatuses have been disconnected, by monitoring the voltages at the CC1 terminal and the CC2 terminal.

With a device compliant with the USB-PD standard, it is assumed that after the Hard Reset command is sent (T402) and VBUS is stopped (T403). VBUS is restarted within 1 sec. Thus it is determined that the power receiving apparatus 20 and the power transmission apparatus 10 have been disconnected if T404 can be executed within 1 sec following T403.

T405 indicates the timing at which the power transmission apparatus 10 and the power receiving apparatus 20 are disconnected, and corresponds to the timing of the determination of Yes in step S308 of FIG. 3. When the power receiving apparatus 20 is disconnected, the state becomes one in which the pull-down resistance has been removed. As such, the voltages at the CC1 terminal and the CC2 terminal change to the pull-up power source of 5 V. At T405, the monitoring unit 109 sends, to the PD communication control unit 102, a signal indicating that the voltages at the CC1 terminal and the CC2 terminal have become 5 V. Having received this signal, the PD communication control unit 102 controls the resistance control unit 108 to change the resistance values of the first variable resistance element 104 and the second variable resistance element 105 from Rp' to Rp. Additionally, the PD communication control unit 102 notifies the user of the change and returns the power transmission apparatus 10 to its initial state, as indicated by step S310 in FIG. 3. If the notifying unit 107 is constituted by a light-emitting element such as a light-emitting diode, for example, the light-emitting element is controlled to be lighted when it is necessary to notify the user, and extinguished when the notification is no longer necessary. This makes it possible to notify the user that the state has changed.

According to the power transmission apparatus of the present embodiment, the resistance value of a pull-up resistance between the CC terminals and the power source is changed from a first resistance value to a second resistance value upon a request to send a hard reset being received from the power receiving apparatus. This makes it possible to suppress situations where the supply of power is resumed, an error occurs again on the receiving apparatus side, and a request to send a hard reset is received again. Accordingly, when the power transmission apparatus and the power receiving apparatus have deviated from a normal operating state, it is possible to maintain a safe stopped state, as well as suppress the occurrence of a situation where the state repeatedly deviates from a normal operating state.

Second Embodiment

Operations carried out by a power transmission apparatus and a power receiving apparatus according to a second embodiment will be described next with reference to FIGS. 2 and 5 to 7.

Figure 5:
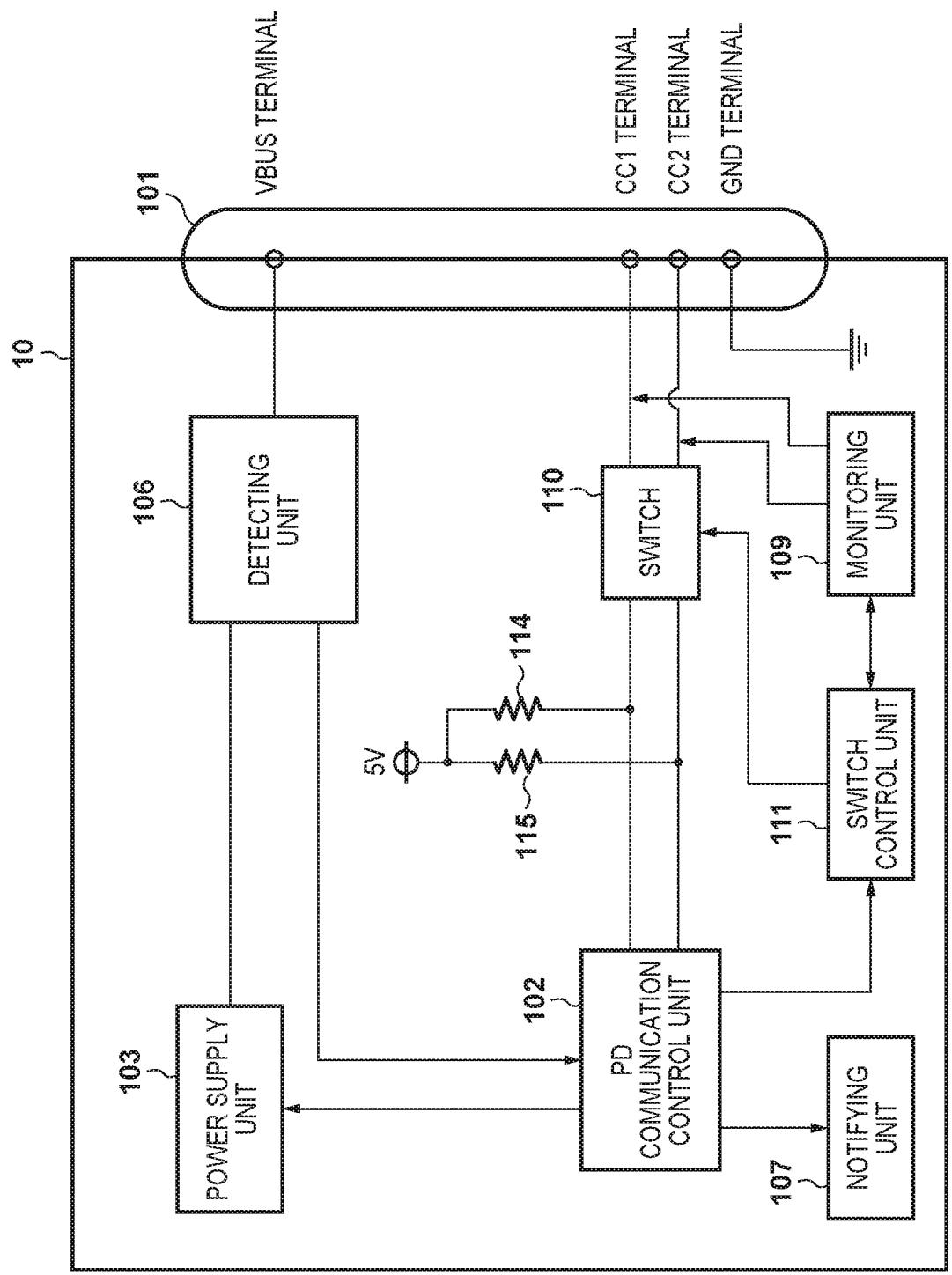
FIG. 5 is a block diagram illustrating a power transmission apparatus according to a second embodiment.

FIG. 5 is a block diagram illustrating the configuration of the power transmission apparatus 10 according to the second embodiment. Elements that are the same as in the power transmission apparatus 10 according to the first embodiment described above (FIG. 1) will be given the same reference signs, and descriptions thereof will be omitted. The differences from FIG. 1 are that a switch 110 and a switch control unit 111 have been added, and the pull-up resistances are resistance elements 114 and 115 having fixed resistance values. The power receiving apparatus 20 according to the present second embodiment is the same as in FIG. 2.

The switch 110 is provided between the connector and the location where the signal lines of the CC1 terminal and the CC2 terminal connect to the pull-up resistance element 114. The switch 110 is a switch for switching the state of connection between the connector 101 and the PD communication control unit 102 between a conductive state (an on state) and an open state (an off state). The switch 110 can be realized by switching a switching element between conductive and non-conductive states. Note that the resistance elements can also be realized using semiconductor elements such as transistors.

The switch control unit 111 controls the switching of the switch 110 between the on state and the off state. The switch control unit 111 controls the switch 110 to turn on or off in response to the monitoring result from the monitoring unit 109. The switch control unit 111 also controls the switch 110 to turn on or off in response to the control signals from the PD communication control unit 102. The switch 110 and the switch control unit 111 constitute switching means that switch the state of connection between the CC terminals and a predetermined voltage (5 V).

Next, processing by the PD communication control unit 102 of the power transmission apparatus 10 when an error has occurred while the power transmission apparatus 10 and the power receiving apparatus 20 are connected according to USB-PD will be described using the flowchart in FIG. 6. The following assumes that the power transmission apparatus 10 and the power receiving apparatus 20 are already in a physically-connected state, and communication and power transfer are carried out according to the USB-PD standard.

In step S601, the PD communication control unit 102 monitors the detecting unit 106. Specifically, the PD communication control unit 102 obtains a signal from the detecting unit 106 to ascertain the state of the detection by the detecting unit 106. In step S602, if the PD communication control unit 102 determines that the signal obtained from the detecting unit 106 indicates a normal state (No in step s602), the process returns to step S601 to continue the monitoring.

If the PD communication control unit 102 has determined that the signal obtained from the detecting unit 106 indicates an error state, e.g., that the temperature near the connector 101 is greater than or equal to a predetermined value (Yes in step S602), the process moves to step S603.

In step S603, the PD communication control unit 102 sends a Hard Reset command according to the USB-PD standard to the PD communication control unit 202 of the power receiving apparatus 20, and moves the process to step S604. Then, in step S604, the PD communication control unit 102 outputs an instruction signal to the power supply unit 103 so as to stop the VBUS output within a predetermined amount of time. According to the USB-PD standard, the stopping of the VBUS output may be started within 25 to 35 ms following the sending of the Hard Reset command.

In step S605, the PD communication control unit 102 outputs a control signal to the notifying unit 107, and notifies the user that an error state has occurred.

In step S606, the PD communication control unit 102 outputs a control signal to the switch control unit 111 to put the switch 110 into an off state (an open state). As a result, the connection between the PD communication control unit 102 and the CC1 terminal and CC2 terminal of the connector 101 is in an open state. Although the power transmission apparatus 10 and the power receiving apparatus 20 are physically connected by the connector 101, communication according to the USB-PD standard cannot be carried out, and thus the Hard Reset instruction is not sent again. Furthermore, on the basis of the USB Type-C standard, the power transmission apparatus 10 recognizes that the power receiving apparatus 20, which had been connected to the power transmission apparatus 10, has been disconnected, and stops the VBUS output within a set amount of time.

In step S607, the PD communication control unit 102 controls the switch control unit 111 to put the switch 110 into an on state (a conductive state). Furthermore, in step S608, the PD communication control unit 102 uses a timer (not shown) to start measuring the amount of time that has passed after the connection between the CC terminals and the power source has switched to the on state (the conductive state).

In step S609, the PD communication control unit 102 controls the monitoring unit 109 to monitor the voltages at the CC1 terminal and the CC2 terminal, and moves the process to step S610.

In step S610, through the monitoring by the monitoring unit 109, the PD communication control unit 102 determines whether or not the voltages at the CC1 terminal and the CC2 terminal are greater than or equal to a predetermined voltage value (4.75 V). If the PD communication control unit 102 determines that the voltages at the CC1 terminal and the CC2 terminal are greater than or equal to 4.75 V (Yes in step S610), the process moves to step S614. At this time, according to the USB Type-C standard, in the power transmission apparatus 10, which is capable of supplying 5 V at 3 A, the CC1 terminal and the CC2 terminal are pulled up to the 5 V power source. Accordingly, the CC1 terminal and the CC2 terminal are at 5 V when the power receiving apparatus 20 is not physically connected, and the power transmission apparatus 10 determines that the power receiving apparatus 20 is in a disconnected state. If the voltages at the CC1 terminal and the CC2 terminal are lower than the predetermined voltage of 4.75 V (No in step S610), the power receiving apparatus 20 remains in a physically-connected state. As such, the PD communication control unit 102 moves the process to step S611. At this time, according to the USB Type-C standard, in the power transmission apparatus 10, which is capable of supplying 5 V at 3 A, the voltages at the CC1 terminal and the CC2 terminal change to a range of from 0.85 V to 2.45 V when the power receiving apparatus 20 is connected. The power transmission apparatus 10 can therefore determine whether or not the power receiving apparatus 20 is connected.

In step S611, it is determined whether or not a predetermined period t1 has passed, using the time measured by the timer. The predetermined period t1 is a period shorter than 100 ms, which is the lower limit value of the tCCDebounce time defined in the Type-C standard. If in step S611 it is determined that the predetermined period t1 has not passed (No in step S611), the process returns to step S609. If in step S611 it is determined that the predetermined period t1 has passed (Yes in step S611), the process moves to step S612.

In step S612, the PD communication control unit 102 controls the switch control unit 111 to put the switch 110 into an off state (an open state), after which the process moves to step S613. In step S613, the PD communication control unit 102 has the switch control unit 111 keep the switch 110 in an off state (the open state) for a predetermined period t2, after which the process moves to step S607. The predetermined period t2 for which the switch 110 is kept in an off state (the open state) may be any desired amount of time.

In step S614, the PD communication control unit 102 controls the switch control unit 111 to keep the switch 110 in an on state (the conductive state). The process then moves to step S615. In step S615, the PD communication control unit 102 outputs, to the notifying unit 107, a control signal different from the control signal output to the notifying unit 107 in step S605. For example, if the notifying unit 107 is lighting means such as a light-emitting diode, and the light-emitting diode has been instructed to light in step S605, the light-emitting diode may be instructed to be extinguished in step S613.

This makes it possible to detect that the power receiving apparatus 20, which had been connected to the power transmission apparatus 10, has been physically removed. The state returns to a disconnected state, in which a predetermined connection process according to the USB Type-C standard can be started, and the sequence of operations then ends.

A sequence according to the second embodiment will be described next with reference to the timing chart in FIG. 7. FIG. 7 is a timing chart illustrating operations from when an error occurs in a state where the power transmission apparatus 10 is connected to the power receiving apparatus 20 and the connection based on the USB-PD standard is complete, to when the VBUS disconnecting process is carried out according to the control illustrated in the above-described FIG. 6, which is a feature of the present second embodiment, and the power receiving apparatus 20 is removed.

The "VBUS terminal voltage" in FIG. 7 indicates the voltage value output to the VBUS terminal of the connector 101 illustrated in FIG. 5, described above. FIG. 7 illustrates a case where, at the point in time when this timing chart starts, a connection based on the USB-PD standard is complete and the VBUS terminal voltage is 20 V.

"CC terminal voltage state" indicates the voltage values of the CC1 terminal and the CC2 terminal of the connector 101 illustrated in FIG. 5. As is clear from the descriptions thus far, the voltage is 1.69 V when the power transmission apparatus 10 and the power receiving apparatus 20 are in a connected state and the state is a normal state. This indicates a state of connection between the power transmission apparatus 10 and the power receiving apparatus 20, where a state where the switch 110 is off is 0 V, and a state where the power transmission apparatus 10 and the power receiving apparatus 20 are not connected is 5 V. The voltage values of the CC terminals may be any values compliant with the USB Type-C standard, and are not particularly limited to the voltage values illustrated in FIG. 7.

Figure 6:
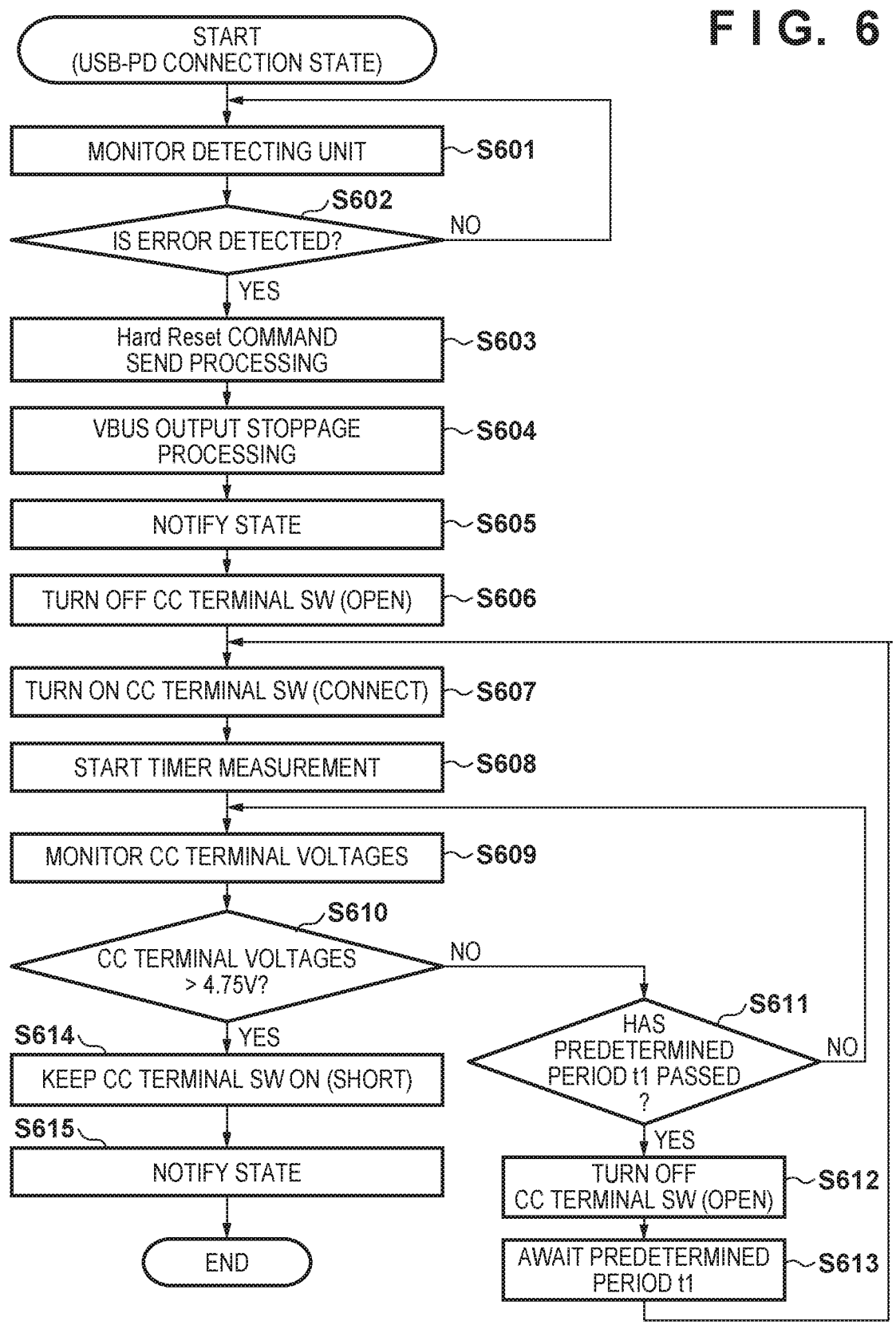
FIG. 6 is a flowchart illustrating a power transmission apparatus-side processing sequence according to the second embodiment.
Figure 7:
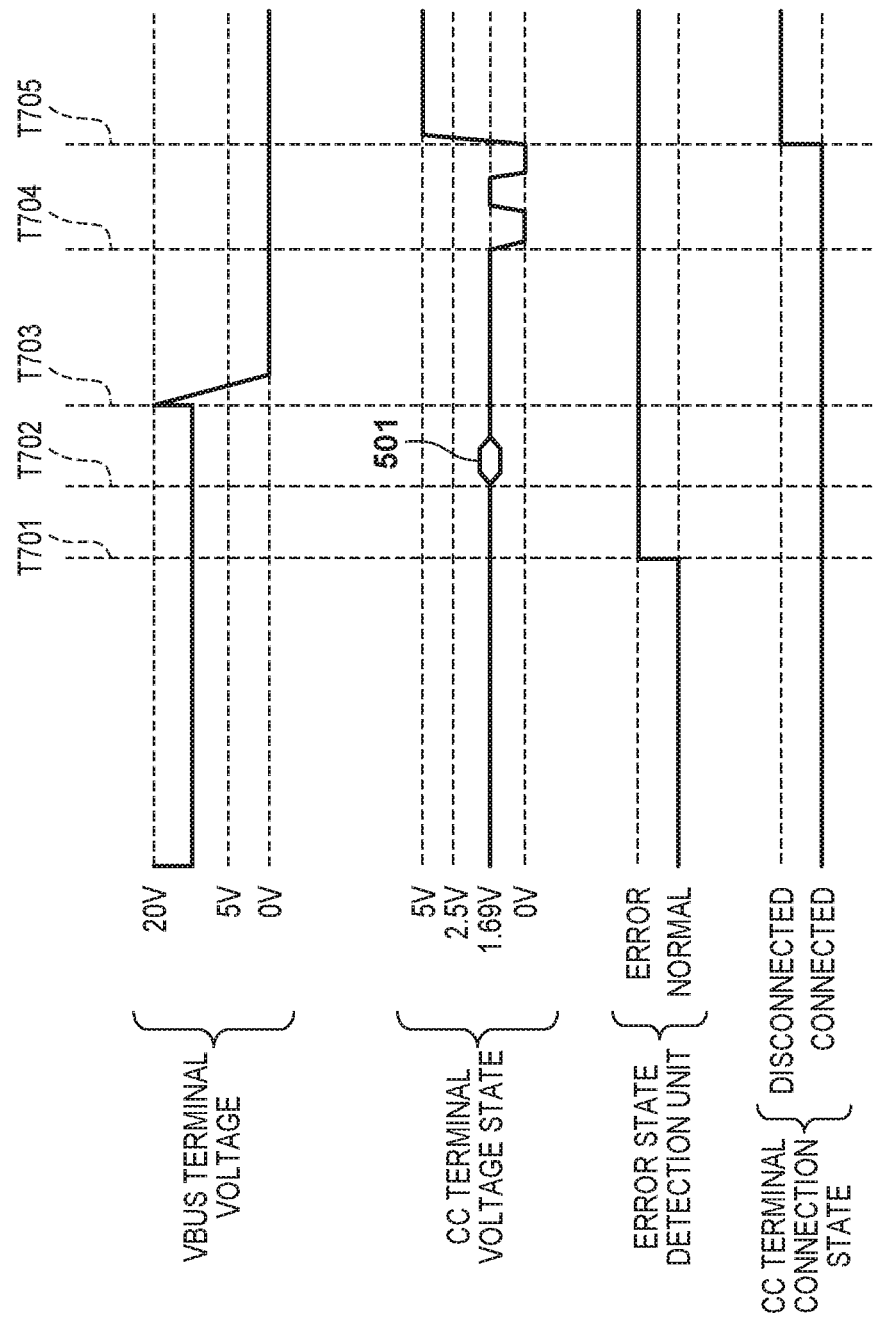
FIG. 7 is a timing chart illustrating operations according to the second embodiment.

T701 is the timing at which the PD communication control unit 102 receives the signal indicating that an error state has been detected by the detecting unit 106, and corresponds to the timing at which the determination of Yes is made in step S602 of FIG. 6, described earlier.

T702 is the timing at which the PD communication control unit 102 sends a Hard Reset command to the power receiving apparatus 20 to stop the USB-PD connection. This is a timing corresponding to step S603 in FIG. 6. Reference sign 501 in FIG. 7 indicates the period in which this command is being sent.

T703 is the timing at which the power supply unit 103 is controlled and the power supply is stopped in order to stop the supply of the VBUS power source after a predetermined amount of time has passed from when the PD communication control unit 102 sent the Hard Reset command. This timing corresponds to step S404 in FIG. 6. According to the USB-PD standard, the VBUS supply is stopped at 25 to 35 msec after the Hard Reset command is sent. This timing is also the timing at which the PD communication control unit 102 according to the present second embodiment notifies the user that an error has occurred, and that the power supply will be stopped, after the VBUS output has been stopped, as indicated by step S605 in FIG. 5.

T704 corresponds to step S606 in FIG. 6. This is the timing at which the PD communication control unit 102 controls the switch control unit 111 to change the switch 110 to a non-conductive state. In the period before T704, the voltages at the CC1 terminal and the CC2 terminal of the connector 101 are 1.69 V, having been divided by the pull-up resistance and the pull-down resistance. According to the USB Type-C standard, the voltage range required for detecting that the power receiving apparatus 20 has been connected corresponds to the voltages at the CC terminals being within a range of from 0.85 V to 2.45 V, and thus from T704 onward, it is determined that the power receiving apparatus 20 is in a connected state. The period from T704 to T705 corresponds to the loop of steps S607, S610, and S611. When the power transmission apparatus 10 and the power receiving apparatus 20 are in a connected state, voltage division is carried out through the pull-down resistance, and thus the voltages at the CC1 terminal and the CC2 terminal are within the range of from 0.85 V to 2.45 V.

With a device compliant with the USB-PD standard, it is assumed that after the Hard Reset command is sent (T702) and VBUS is stopped (T703), VBUS is restarted within 1 sec. Thus it is determined that the power receiving apparatus 20 and the power transmission apparatus 10 have been disconnected if T704 can be executed within 1 sec following T703.

T705 indicates the timing at which the power transmission apparatus 10 and the power receiving apparatus 20 are physically disconnected. This is a timing from step S607 in FIG. 6 to a determination of Yes in step S609. In response to the power receiving apparatus 20 being removed from the power transmission apparatus, the PD communication control unit 102 changes the voltages at the CC1 terminal and the CC2 terminal to the pulled-up power source of 5 V. At T705, the monitoring unit 109 notifies the PD communication control unit 102 that the voltages at the CC1 terminal and the CC2 terminal have become 5 V. As a result, the PD communication control unit 102 instructs the switch control unit 111 to change the conductive state of the switch 110 to a connected state, which corresponds to step S612 in FIG. 6. Additionally, the user is notified of the change, and the power transmission apparatus 10 returns to its initial state, as indicated by step S613 in FIG. 6. If the notifying unit 107 is constituted by a light-emitting element such as a light-emitting diode, for example, the light-emitting element is controlled to be lighted when it is necessary to notify the user, and extinguished when the notification is no longer necessary. This makes it possible to notify the user that the state has changed.

According to the power transmission apparatus of the present embodiment, the connection between the CC terminals and the power source is transitioned to an open state upon a request to send a hard reset being received from the power receiving apparatus. This makes it possible to suppress situations where the supply of power is resumed, an error occurs again on the receiving apparatus side, and a request to send a hard reset is received again. Accordingly, when the power transmission apparatus and the power receiving apparatus have deviated from a normal operating state, it is possible to maintain a safe stopped state, as well as suppress the occurrence of a situation where the state repeatedly deviates from a normal operating state.

Third Embodiment

Figure 8:
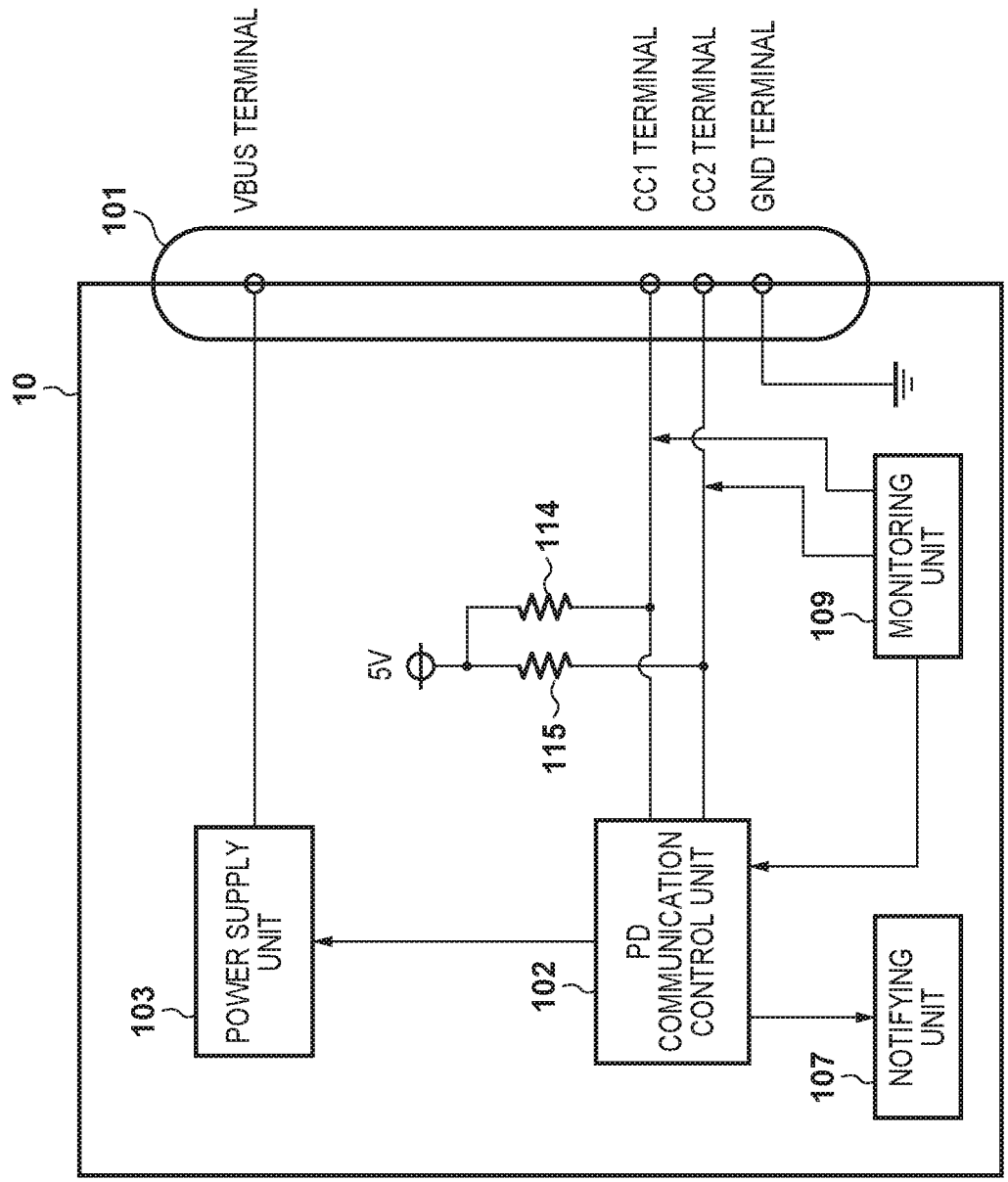
FIG. 8 is a block diagram illustrating a power transmission apparatus according to a third embodiment.
Figure 9:
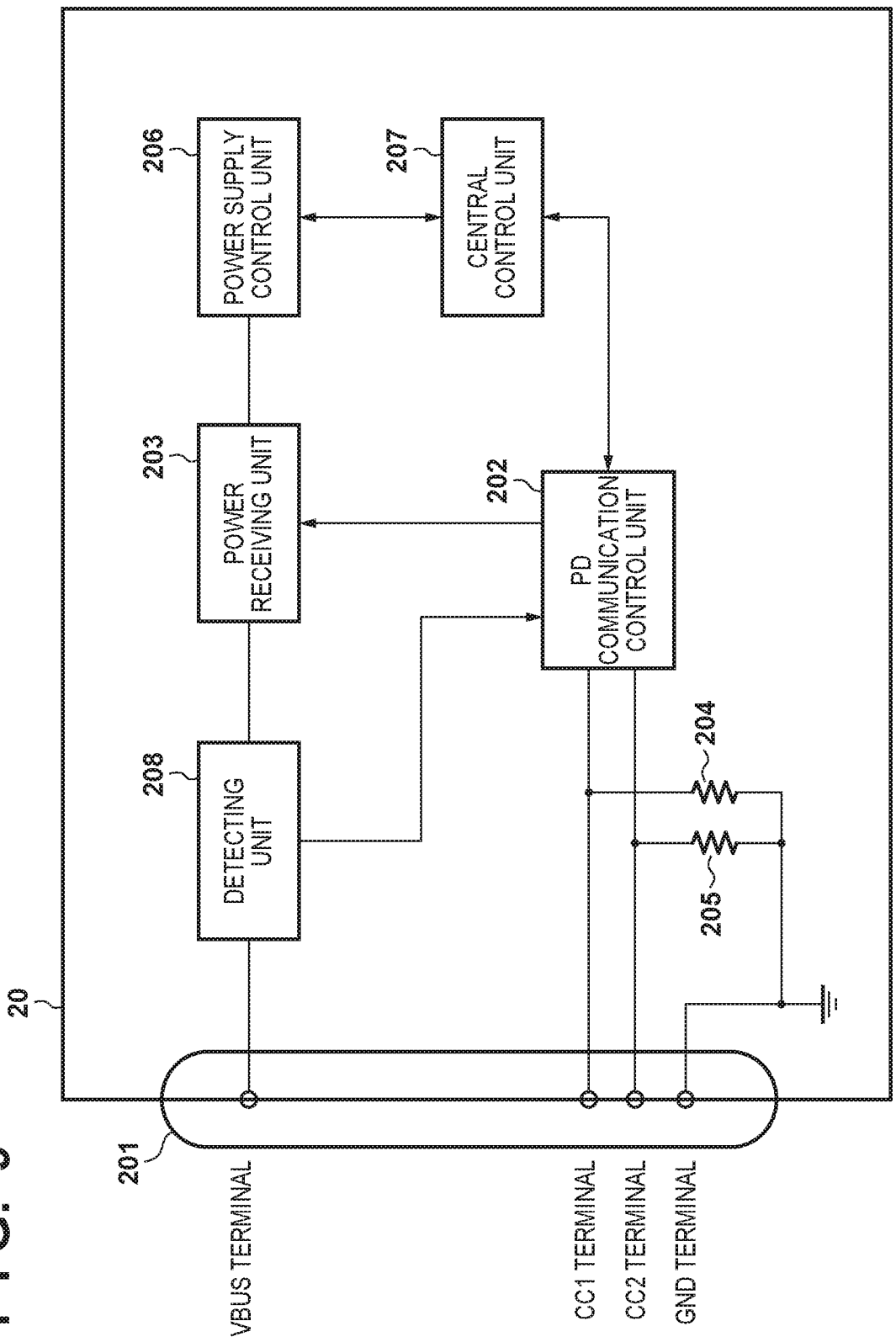
FIG. 9 is a block diagram illustrating a power receiving apparatus according to the third embodiment.

A third embodiment will now be described. FIG. 8 is a block diagram illustrating the power transmission apparatus 10 according to the present third embodiment, and FIG. 9 is a block diagram illustrating the power receiving apparatus 20. In the first embodiment, the detecting unit 106, which detects overcurrent, overvoltage, a high temperature exceeding a threshold, or the like, is provided on the power transmission apparatus 10 side. The present third embodiment differs from the first embodiment in that a detecting unit 208, which detects the same type of states, is provided on the power receiving apparatus 20 side. The resistance elements 114 and 115 in the power transmission apparatus 10 are resistance elements that pull up the CC1 terminal and the CC2 terminal, and need not be variable resistance elements. The rest of the hardware configuration is the same as that illustrated in FIGS. 1 and 2, and will therefore not be described here.

According to the present third embodiment, when the PD communication control unit 202 of the power receiving apparatus 20 has obtained, from the detecting unit 208, a signal indicating that an abnormal rise in temperature has been detected in the connector 201, for example, the PD communication control unit 202 sends, as a warning signal, a signal indicating the detected error state to the power transmission apparatus 10. Then, the PD communication control unit 202 sends a Hard Reset request command (reset request command) to the power transmission apparatus 10.

Figure 10:
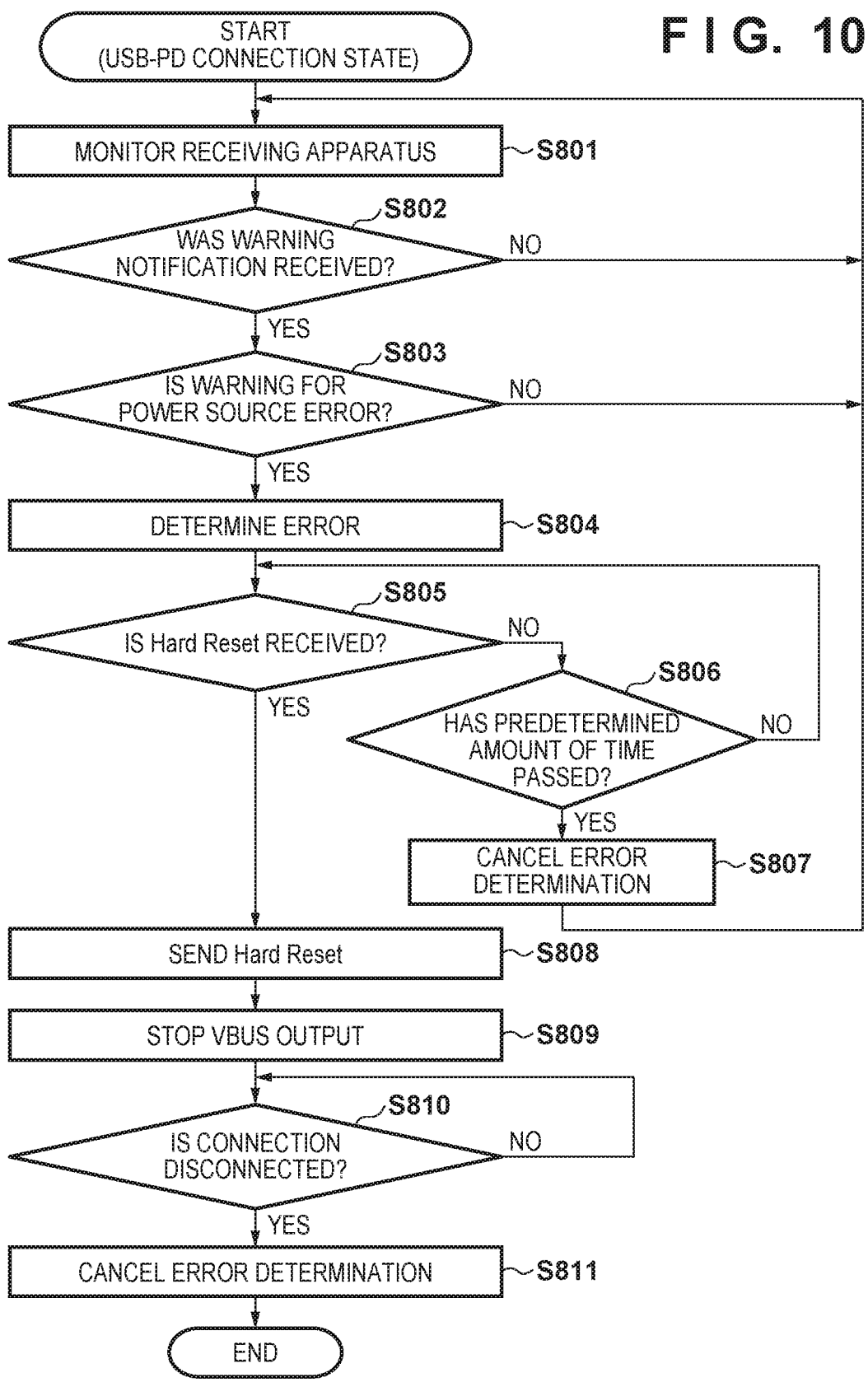
FIG. 10 is a flowchart illustrating a power transmission apparatus-side processing sequence according to the third embodiment.

Details of the processing carried out by the PD communication control unit 102 of the power transmission apparatus 10 will be described next in light of the foregoing points, with reference to the flowchart in FIG. 10. Processing carried out by the PD communication control unit 102 when an error state arises while the power transmission apparatus 10 and the power receiving apparatus 20 are connected through USB-PD will be described in the present third embodiment as well.

In step S801, the PD communication control unit 102 monitors the power receiving apparatus 20 by obtaining a signal from the (PD communication control unit 202 of the) power receiving apparatus 20.

In step S802, the PD communication control unit 102 determines whether or not the warning signal has been received from the power receiving apparatus 20. If the PD communication control unit 102 determines that the warning signal has not been received (No in step S802), the process returns to step S801, where the monitoring of the power receiving apparatus 20 is continued. However, if the PD communication control unit 102 determines that the warning signal has been received (Yes in step S802), the process moves to step S803.

In step S803, the PD communication control unit 102 determines whether or not the warning signal was caused by a power source error. VBUS overvoltage, overcurrent, the temperature near the connector 201 of the power receiving apparatus 20 rising to greater than or equal to a predetermined temperature, and so on can be given as examples of the power source error. Then, in step S804, the PD communication control unit 102 determines that a power source error has occurred. When it is determined that a power source error has occurred, the PD communication control unit 102 changes a flag indicating a power source error to an on state. This flag is held in memory or the like (not shown). Additionally, the PD communication control unit 102 uses a timer (not shown) to start measuring the amount of time that has passed.

In step S805, the PD communication control unit 102 determines whether or not the Hard Reset request command, defined in the USB-PD standard, has been received from the power receiving apparatus 20. If the PD communication control unit 102 determines that the Hard Reset request command has been received (Yes in step S805), the process moves to step S808, whereas if it is determined that the command has not been received (No in step S805), the process moves to step S806.

In step S806, the PD communication control unit 102 determines whether or not a predetermined amount of time has passed following the error determination. If the PD communication control unit 102 determines that the amount of time that has passed following the error determination has not reached a predetermined amount of time, the process returns to step S805, where the PD communication control unit 102 stands by to receive the Hard Reset request. However, if the PD communication control unit 102 determines that the amount of time that has passed following the error determination has reached the predetermined amount of time, the process moves to S807. In step S807, the PD communication control unit 102 cancels the error determination, returns the process to step S801, and continues to monitor the power receiving apparatus 20. The process for canceling the error determination refers specifically to a process in which the PD communication control unit 102 changes the flag indicating the power source error to an off state.

In step S808, the PD communication control unit 102 sends a Hard Reset command, according to the USB-PD standard, to the (PD communication control unit 202 of the) power receiving apparatus 20. Then, in step S809, the PD communication control unit 102 controls the power supply unit 103 to stop the VBUS output. According to the USB-PD standard, the stopping of the VBUS output may be started within 25 to 35 ms following the Hard Reset instruction, and the embodiment assumes that the PD communication control unit 102 stops the VBUS output in accordance therewith.

In step S810, the PD communication control unit 102 stands by for the power receiving apparatus 20 to be physically disconnected. Upon determining that the power transmission apparatus 10 and the power receiving apparatus 20 have been physically disconnected, the voltages at the CC1 terminal and the CC2 terminal of the power transmission apparatus 10 take on the pulled-up voltage of 5 V, in response to the pull-down resistance being in a disconnected state. In other words, the PD communication control unit 102 can determine whether or not the power receiving apparatus 20 has been physically disconnected by determining whether or not a signal, indicating that the voltage has become 5 V, has been received from the monitoring unit 109. If the PD communication control unit 102 determines that the power receiving apparatus 20 has been physically disconnected (Yes in step S810), the process moves to step S811. In step S811, the PD communication control unit 102 cancels the determination of the error state, and the sequence of operations ends.

Through this, the power transmission apparatus 10 can detect an error state through the detecting unit 208 of the power receiving apparatus 20, and can send a Hard Reset command.

According to the power transmission apparatus of the present embodiment, when a power transmission apparatus and a power receiving apparatus have deviated from a normal operating state, it is possible to maintain a safe stopped state, as well as suppress the occurrence of a situation where the state repeatedly deviates from a normal operating state.

Fourth Embodiment

A fourth embodiment will now be described. The configurations of the power transmission apparatus 10 and the power receiving apparatus 20 according to the present fourth embodiment are the same as those illustrated in FIGS. 8 and 9, described in the third embodiment, and will therefore not be described here. Processing by the PD communication control unit 102 of the power transmission apparatus 10 when an error has occurred while the power transmission apparatus 10 and the power receiving apparatus 20 are connected according to USB-PD will be described below using the flowchart in FIG. 11. The present fourth embodiment also assumes that the power transmission apparatus 10 and the power receiving apparatus 20 are already in a connected state, and communication and power transfer are carried out according to the USB-PD standard.

First, in step S901, the PD communication control unit 102 obtains identification information pertaining to the connected power receiving apparatus 20. In the present embodiment, the identification information is assumed to be vendor definition information such as manufacturer information or a manufacturer name, definition data unique to a vendor, or the like, according to communication specifications compliant with the USB-PD standard. However, the type of the information is not particularly limited as long as it can be determined whether or not the power receiving apparatus 20 is the same as a previously-connected power receiving apparatus 20 at the time of reconnection, which will be described later.

In step S902, the PD communication control unit 102 determines whether or not the Hard Reset request command, defined in the USB-PD standard, has been received from the power receiving apparatus 20 side (the PD communication control unit 202). The PD communication control unit 102 moves the process to step S903 if it is determined that the Hard Reset request command has not been received (No in step S902), and moves the process to step S904 if it is determined that the command has been received.

In step S903, the PD communication control unit 102 determines whether or not the power receiving apparatus 20 has been disconnected. The PD communication control unit 102 returns the process to step S902 if it is determined that the power receiving apparatus 20 is connected (No in step S903), and moves the process to step S910 if it is determined that the power receiving apparatus 20 has been disconnected (Yes in step S903).

In step S904, the PD communication control unit 102 adds 1 to a counter, provided internally, for counting the number of times the Hard Reset request command has been received. Then, in step S905, the PD communication control unit 102 obtains the current time at which the Hard Reset request command was received, using a timer (not shown). It is assumed that the counter, the time, and the like are held in memory, a register, or the like (not shown) within the PD communication control unit 102. Then, in step S906, the PD communication control unit 102 controls the power supply unit 103 to respond to the Hard Reset request command, and stops the supply of power by VBUS.

In step S907, the PD communication control unit 102 determines whether or not the value (number) held by the counter has become greater than or equal to a predetermined value. In step S908, the PD communication control unit 102 determines whether or not a difference (a time interval) between the time at which the present Hard Reset request was received and the time at which the previous Hard Reset request was received is within a predetermined value.

The PD communication control unit 102 moves the process to step S909 when the number of times the Hard Reset request command has been received reaches a predetermined value (Yes in step S907) or when the time interval of the Hard Reset request command received this time is within a predetermined value (No in step S908). Then, in step S909, the PD communication control unit 102 stands by for the power receiving apparatus 20 to be physically disconnected. In other words. VBUS is not started again while standing by for the disconnect.

If, in step S909, the PD communication control unit 102 has determined that the USB connector has been physically disconnected, the process moves to step S910. In step S910, the PD communication control unit 102 stands by for a reconnection. If, in step S910, the PD communication control unit 102 has detected a reconnection with the connector 101, the process moves to step S911.

In step S911, the PD communication control unit 102 controls the power supply unit 103 to restart the power supply by VBUS. Then, in step S912, the PD communication control unit 102 obtains the identification information from the reconnected apparatus, and determines whether or not the information matches the identification information identified earlier in step S901, i.e., whether or not the power receiving apparatuses 20 before and after the reconnection are the same device. The PD communication control unit 102 moves the process to step S913 if it is determined that the devices are the same (Yes in step S912). However, the PD communication control unit 102 moves the process to step S914 if it is determined that the devices are different (No in step S912).

In step S913, the PD communication control unit 102 determines whether or not a predetermined amount of time has passed since the Hard Reset request command was last received. The PD communication control unit 102 moves the process to step S902 if it is determined that the predetermined amount of time has not passed since the Hard Reset request command was last received (No in step S913). However, if the PD communication control unit 102 determines that the predetermined amount of time has passed (Yes in step S913), the process moves to step S914.

In step S914, the PD communication control unit 102 clears the counter for counting the Hard Reset request commands and the time at which the Hard Reset request was received, and returns the process to step S902.

As a result, according to the present fourth embodiment, when, in a USB-PD connection, some kind of error arises in the power receiving apparatus 20, the supply of power by VBUS is intermittently stopped until a preset number of Hard Reset requests are received. When that number of Hard Reset requests has been received, the supply of power is stopped until the USB-PD connection is actually terminated. Accordingly, when the power transmission apparatus and the power receiving apparatus have deviated from a normal operating state, it is possible to maintain a safe stopped state, as well as suppress the occurrence of a situation where the state repeatedly deviates from a normal operating state.

Fifth Embodiment

Figure 12:
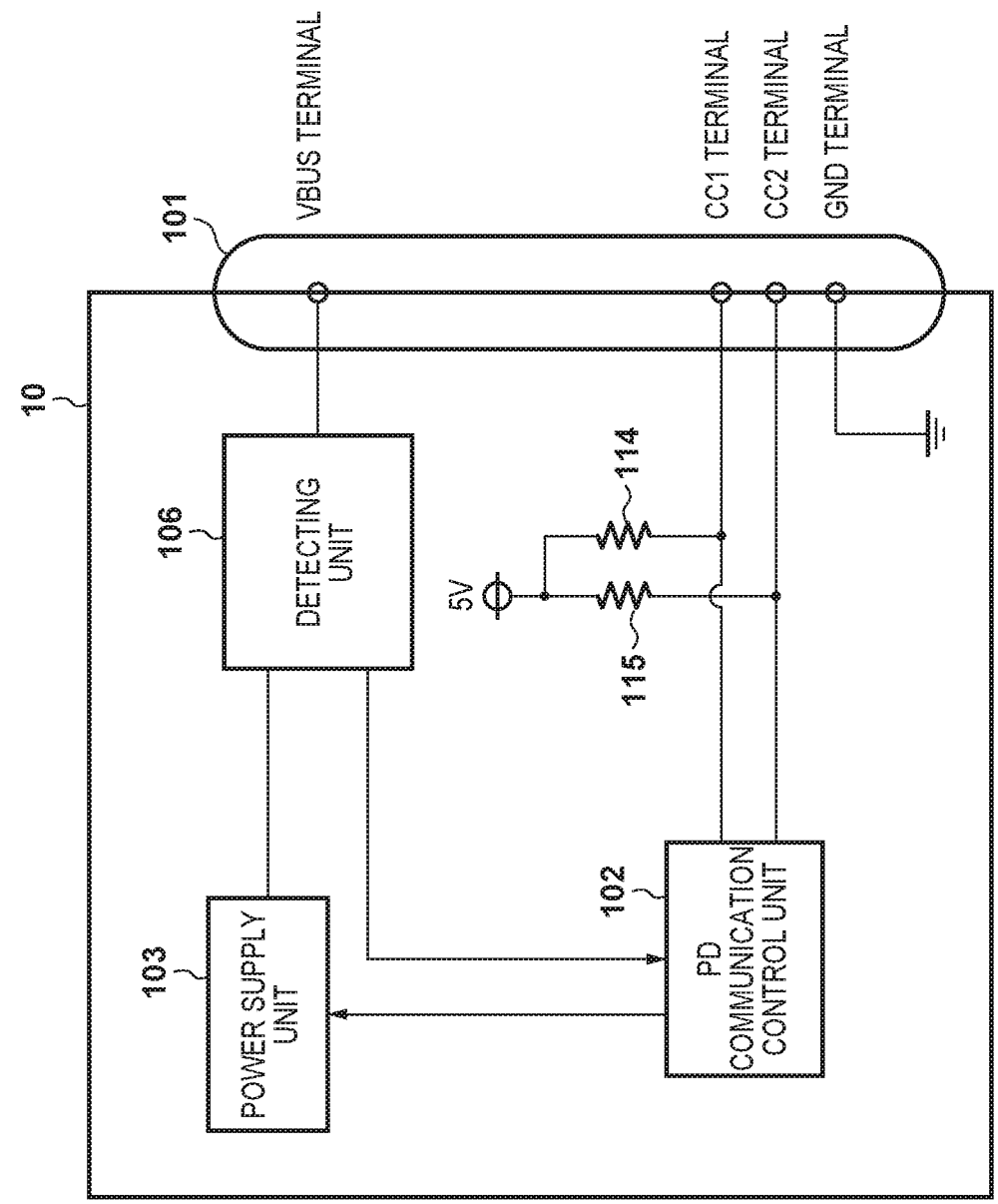
FIG. 12 is a block diagram illustrating a power transmission apparatus according to a fifth embodiment.
Figure 13:
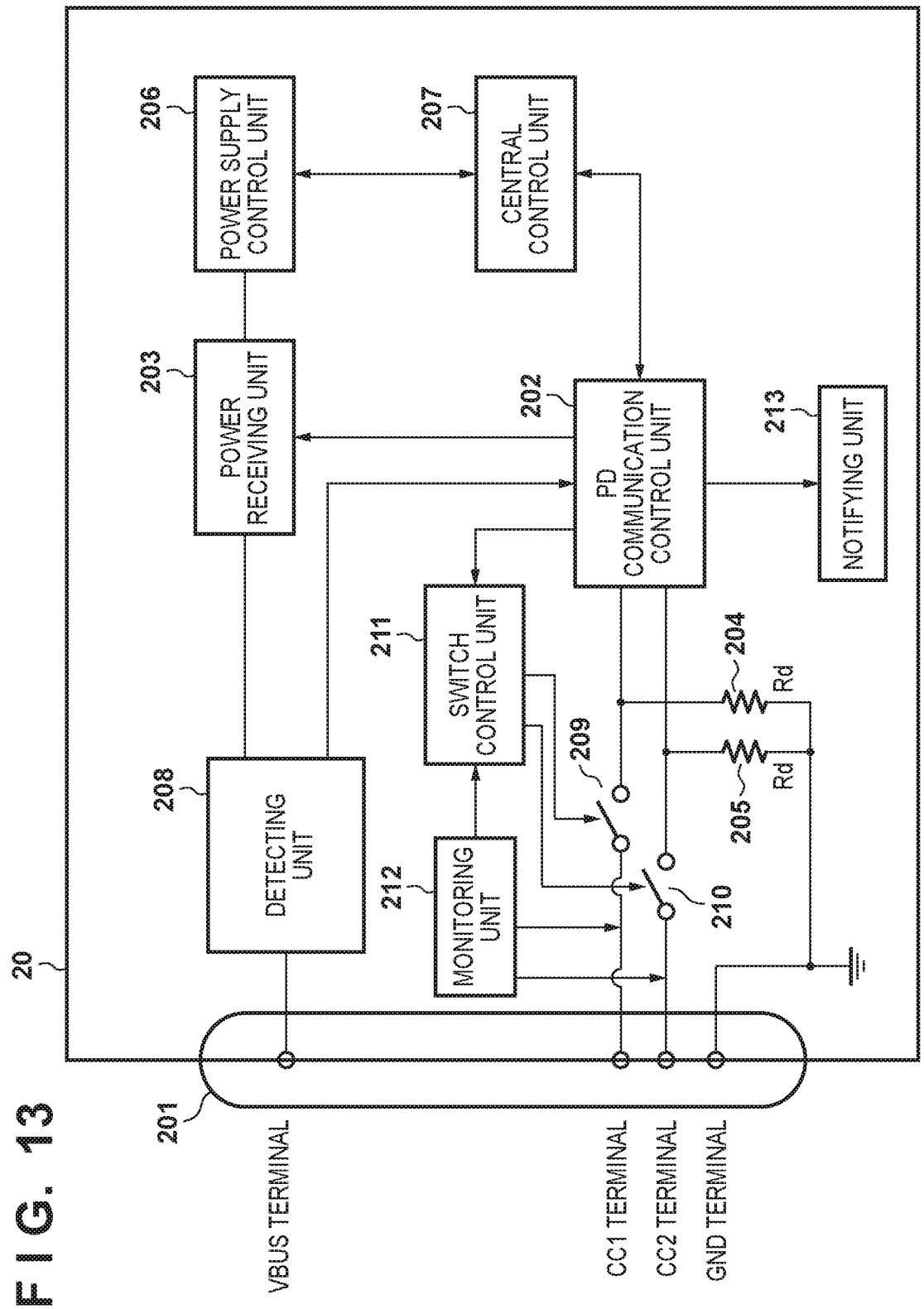
FIG. 13 is a block diagram illustrating a power receiving apparatus according to the fifth embodiment.
Figure 14:
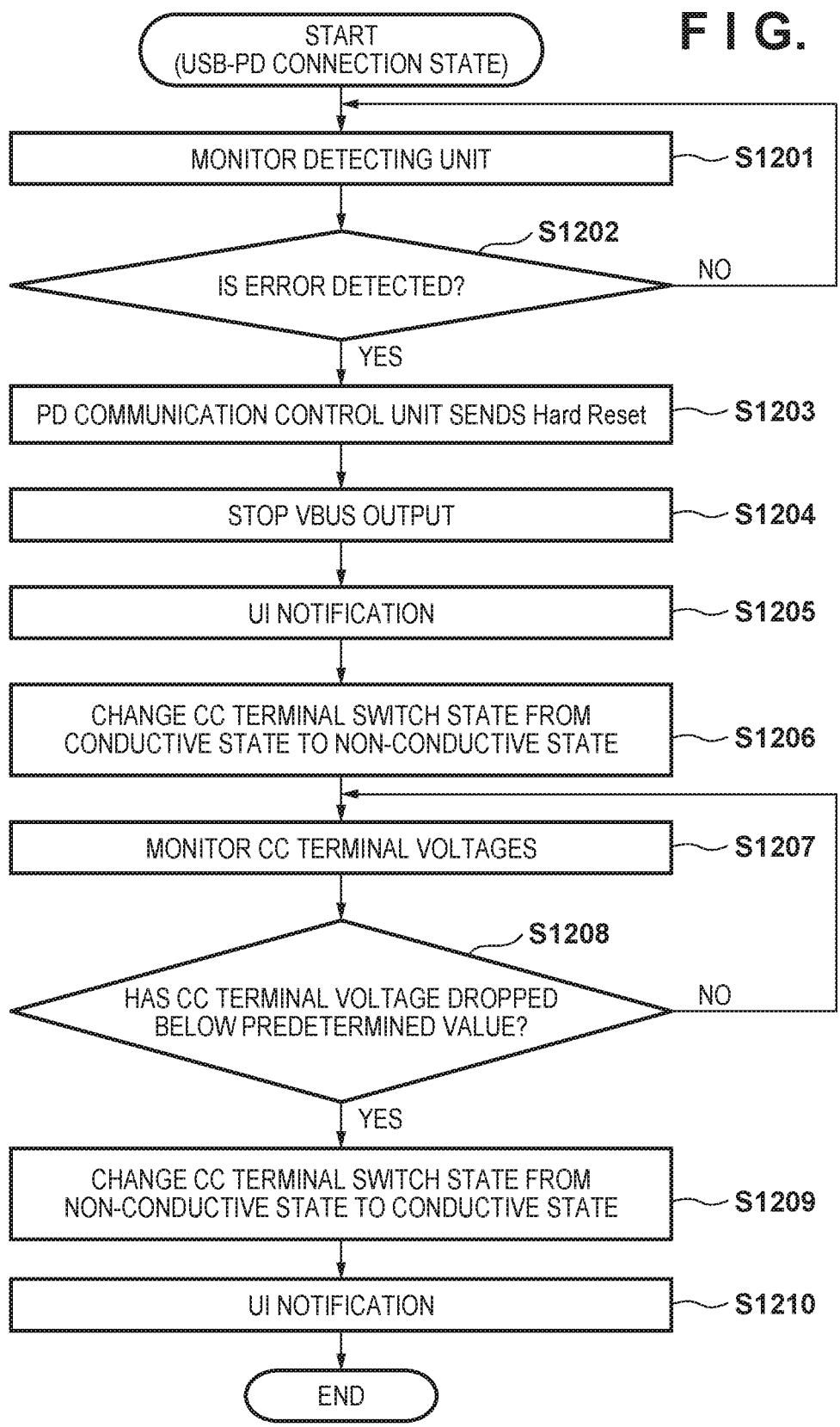
FIG. 14 is a flowchart illustrating a power receiving apparatus-side processing sequence according to the fifth embodiment.
Figure 15:
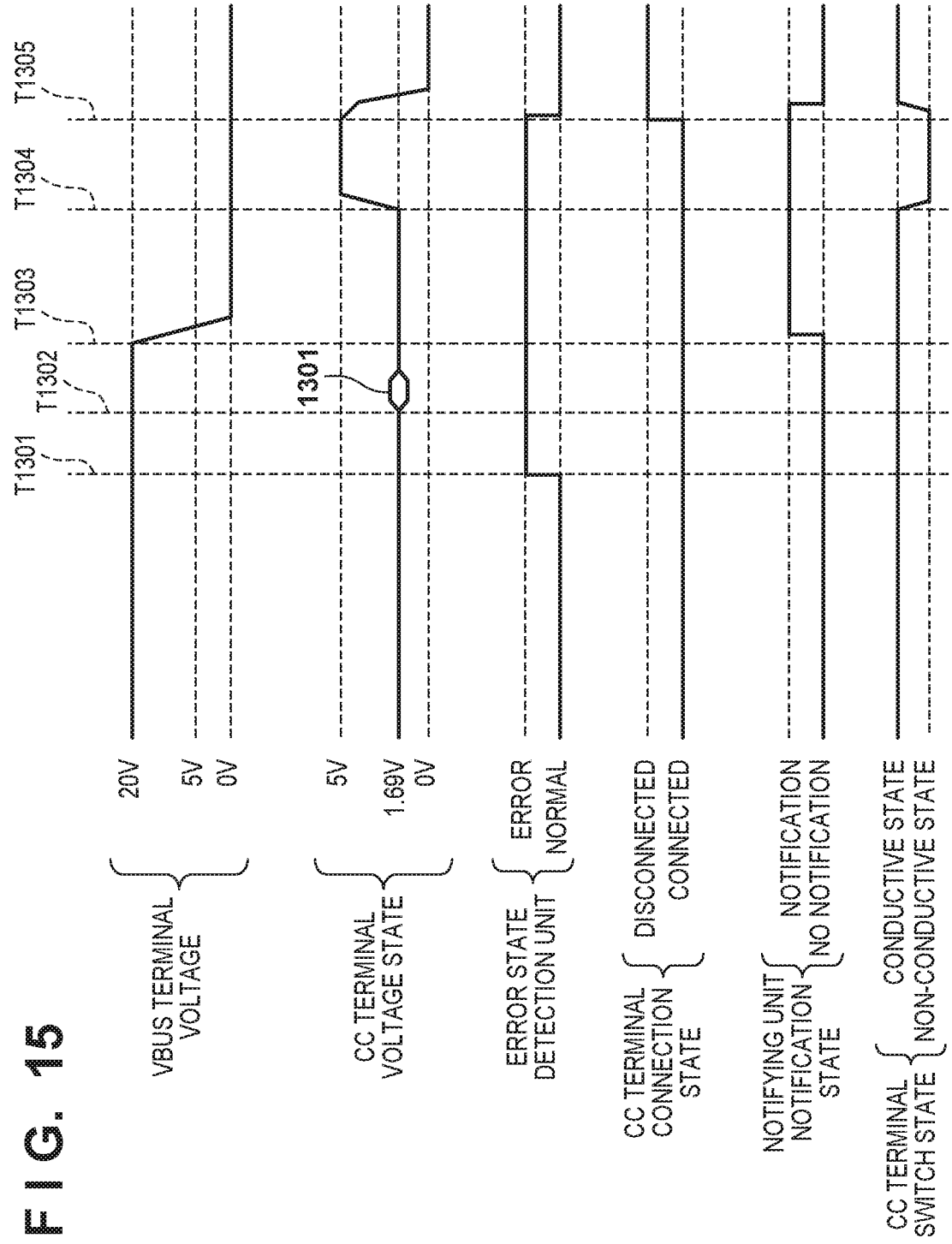
FIG. 15 is a timing chart illustrating operations according to the fifth embodiment.

Next, a power receiving apparatus according to a fifth embodiment will be described with reference to FIGS. 12 to 15. FIG. 12 is a block diagram illustrating the power transmission apparatus 10 according to the fifth embodiment, and FIG. 13 is a block diagram illustrating the power receiving apparatus 20 according to the fifth embodiment. FIG. 14 illustrates a processing sequence carried out by the PD communication control unit of the power receiving apparatus 20, and FIG. 15 is a timing chart according to the fifth embodiment. Note that although the essential parts in the first to fourth embodiments described above were on the power transmission apparatus 10 side, the essential parts are on the power receiving apparatus 20 (image capturing apparatus) side in the present fifth embodiment The power transmission apparatus 10 according to the fifth embodiment includes the connector 101, the PD communication control unit 102, the power supply unit 103, the detecting unit 106, and the resistance elements 114 and 115. The connector 101 is a connector compliant with the USB Type-C standard, and includes terminals such as a VBUS terminal for supplying power, a CC1 terminal and a CC2 terminal used for detecting connections and communicating between devices, a D+ terminal and a D− terminal used for USB 2.0 communication, and a GND terminal. The PD communication control unit 102, the power supply unit 103, and the detecting unit 106 have the same reference signs as in the foregoing embodiments, and therefore will not be described here. The resistance element 114 is a resistance element that pulls the CC1 terminal up to a predetermined voltage with a predetermined resistance value. The resistance element 115 is a resistance element that pulls the CC2 terminal up to a predetermined voltage with a predetermined resistance value. Here, the predetermined voltage is 5 V, for example, and the resistance elements 114 and 115 are at 10 kΩ. According to the USB Type-C standard, the power receiving apparatus-side CC1 terminal and CC2 terminal connected to the power transmission apparatus 10 are pulled down to ground (GND) via 5.1 kΩ resistance elements.

The power receiving apparatus 20 according to the fifth embodiment includes the connector 201, the PD communication control unit 202, the power receiving unit 203, resistance elements 204 and 205, the power supply control unit 206, the central control unit 207, the detecting unit 208, a first switching element 209, a second switching element 210, a switch control unit 211, a monitoring unit 212, and a notifying unit 213. Of these, the connector 201, the power receiving unit 203, the first resistance element 204, the second resistance element 205, the power supply control unit 206, and the central control unit 207 have the same reference signs as in FIG. 2, described earlier in the first embodiment, and will therefore not be described.

The detecting unit 208 detects an error when overvoltage or overcurrent occurs in the output state of the VBUS power source supplied from the power transmission apparatus 10, when the temperature near the connector 201 exceeds a predetermined threshold, or the like. For example, the detecting unit 208 includes a detection resistor or an instrument amplifier so as to detect VBUS overcurrent. The detecting unit 208 also includes a temperature detecting element such as a thermistor so as to be capable of detecting a temperature. The detecting unit 208 further includes an AD converter so as to be capable of detecting VBUS overvoltage.

The PD communication control unit 202 monitors a detection signal output by the detecting unit 208, and when there is a signal indicating an error state, the PD communication control unit 202 outputs an instruction to the power receiving unit 203 for limiting the current supplied from the VBUS terminal, notifying the (PD communication control unit 102 of the) power transmission apparatus 10 using the CC1 terminal and the CC2 terminal, and so on.

The first switching element 209 switches the connection between the CC1 terminal of the connector 201 and a node connecting the CC1 terminal to the first resistance element 204 between conductive and non-conductive states. The second switching element 210 switches the connection between the CC2 terminal of the connector 201 and a node connecting the CC2 terminal to the second resistance element 205 between conductive and non-conductive states. The first switching element 209 and the second switching element 210 may be constituted by semiconductor elements such as transistors.

The switch control unit 211 switches the first switching element 209 and the second switching element 210 to one of a conductive or a non-conductive state on the basis of a control signal from the PD communication control unit 202, the monitoring unit 212, or the like. Note that the switch control unit 211 controls the first switching element 209 and the second switching element 210 so that the initial state thereof (before connecting to the power transmission apparatus 10) is a conductive state.

The monitoring unit 212 monitors the voltage values at the CC1 terminal and the CC2 terminal of the connector 201. The monitoring unit 212 is constituted by an A/D converter, a comparator, and the like, for example, and outputs, to the PD communication control unit 202 and the switch control unit 211, a signal indicating whether or not the voltage value at one of the CC1 terminal and the CC2 terminal is within a predetermined voltage range or is outside of the predetermined voltage range. Note that the monitoring unit 212 may communicate the voltage values at the CC1 terminal and the CC2 terminal to the PD communication control unit 202, the switch control unit 211, or the like.

The notifying unit 213 notifies a user, who is using the power receiving apparatus 20, of the state of the power receiving apparatus 20. For example, if the notifying unit 213 includes a light-emitting element such as a light-emitting diode, an operating/non-operating state can be represented visually by lighting and extinguishing the light-emitting element, and a state different from both the operating/non-operating states can be represented by flashing the light-emitting element. The notifying unit is not limited to a light-emitting element such as a light-emitting diode, and may be any means capable of making a notification to the user. The notification may be made through audio, using a speaker, an electronic buzzer, or the like, or the state may be communicated in detail through text, images, and the like using a display device such as a screen. The notifying means of the notifying unit 213 is not limited to a light-emitting diode, and may be any means capable of notifying the user. For example, the notifying unit 213 may have an audio configuration using a speaker, an electronic buzzer, or the like, a video configuration that uses text, images, and the like through a display device such as a screen, or a combination thereof.

The details of processing by the PD communication control unit 202 of the power receiving apparatus 20, when an error occurs while the power receiving apparatus 20 is receiving power from the power transmission apparatus 10 according to the USB-PD standard, will be described with reference to the flowchart in FIG. 14. The following assumes that the power transmission apparatus 10 and the power receiving apparatus 20 are already in a physically-connected state, and communication and power transfer are carried out according to the USB-PD standard. In other words, the power transmission apparatus 10 and the power receiving apparatus 20 are connected, and the voltage level of at least one of the CC1 terminal and the CC2 terminal is a voltage level within the voltage range for determining a connection between the devices (from 0.85 to 2.45 V).

In step S1201, the PD communication control unit 202 monitors the detecting unit 208. Specifically, the PD communication control unit 202 obtains a signal from the detecting unit 208 to ascertain the state of the detection by the detecting unit 208. In step S1202, if the PD communication control unit 202 determines that the signal obtained from the detecting unit 208 indicates a normal state (No in step S1202), the process returns to step S1201 to continue the monitoring.

On the other hand, if the signal obtained from the detecting unit 208 indicates an error state, such as that the temperature near the connector 201 of the power receiving apparatus 20 has risen to a temperature greater than or equal to a predetermined temperature (Yes in step S1202), the PD communication control unit 202 moves the process to step S1203.

In step S1203, the PD communication control unit 202 sends a Hard Reset request command, according to the USB-PD standard, to the PD communication control unit 102 of the power transmission apparatus 10. Then, the PD communication control unit 202 moves the process to step S1204. In step S1204, the PD communication control unit 202 stands by for the reception of power by VBUS to stop after sending the Hard Reset request command. According to the USB-PD standard, the stopping of the VBUS output starts between 25 and 35 ms following the Hard Reset request.

In step S1205, the PD communication control unit 202 outputs a control signal to the notifying unit 213, and notifies the user that an error state has occurred. Then, in step S1206, the PD communication control unit 202 controls the switch control unit 211 to cause the first switching element 209 and the second switching element 210 to change from a conductive state to a non-conductive state.

The above example assumes that when an error has been detected (Yes in step S1202), the PD communication control unit 202 sends a Hard Reset request command to the power transmission apparatus 10 (step S1203), and then changes the first and second switching elements 209 and 210 from the conductive state to the non-conductive state (step S1206). However, the PD communication control unit 202 may move to step S1206 when an error has been detected (Yes in step S1202). Then, the PD communication control unit 202 may stop the conductivity of the power transmission apparatus 10 by changing the first and second switching elements 209 and 210 from the conductive state to the non-conductive state (step S1206).

As a result of the process of step S1206, the first switching element 209 and the second switching element 210 are in a non-conductive state. Accordingly, the voltages at the CC1 terminal and the CC2 terminal of the connector 201 rise to 5 V under the influence of the pull-up resistance elements 114 and 115 of the power transmission apparatus 10. According to the USB Type-C standard, when, in the power transmission apparatus 10 which transmits power of 5 V at 3 A, the voltages at the CC1 terminal and the CC2 terminal are within a range of from 0.85 V to 2.45 V, the power transmission apparatus 10 determines that the power receiving apparatus 20 is connected. In the present embodiment, the voltages at the CC1 terminal and the CC2 terminal are 5 V, which is outside the range for the connection state as defined by the USB Type-C standard, and the power transmission apparatus 10 determines that the power receiving apparatus 20 is not connected as a result. In other words, the power transmission apparatus 10 does not supply power to the power receiving apparatus 20 in this state.

In step S1207, the PD communication control unit 202 monitors the voltages at the CC1 terminal and the CC2 terminal on the basis of a signal from the monitoring unit 212. Then, in step S1208, the PD communication control unit 202 determines whether or not the voltages at the CC1 terminal and the CC2 terminal of the connector 201 have dropped below a predetermined value (a value less than 5 V). The monitoring in step S1207 is continued until the PD communication control unit 202 determines that the voltages at the CC1 terminal and the CC2 terminal of the connector 201 have dropped below the predetermined value.

The voltages at the CC1 terminal and the CC2 terminal of the connector 201 fall below the predetermined value when the power transmission apparatus 10 has been physically disconnected from the power receiving apparatus 20. The reason for this is that when the apparatuses are physically disconnected, the effect of the resistance elements for pulling the CC1 terminal and the CC2 terminal of the power transmission apparatus 10 up to 5 V no longer applies, and the voltages at the CC1 terminal and the CC2 terminal in the connector 201 on the power receiving apparatus 20 side drop due to natural discharge. Thus in this embodiment, the above-described predetermined value is set to 4.75 V in order to detect that the natural discharge has progressed to a certain degree. The PD communication control unit 202 moves the process to step S1209 if the voltages at the CC1 terminal and the CC2 terminal have dropped below 4.75 V (Yes in step S1208).

In step S1209, the PD communication control unit 202 controls the switch control unit 211 to change the first switching element 209 and the second switching element 210 from a non-conductive state to a conductive state, and then moves the process to step S1210.

In step S1210, the PD communication control unit 202 outputs a control signal, different from the signal output earlier in step S1205, to the notifying unit 213, and notifies the user that the power transmission apparatus 10 has been disconnected and the error state in the supply of power has been lifted. For example, if the notifying unit 213 is a device such as a light-emitting diode, and the light-emitting diode has been instructed to light in step S1205, the light-emitting diode may be instructed to be extinguished in step S1210.

This makes it possible for the power receiving apparatus 20 to detect that the power transmission apparatus 10, which had been connected, has been physically removed. The state returns to the initial state, in which a predetermined connection process according to the USB Type-C standard can be started, and the sequence of operations then ends.

Details of the processing by the PD communication control unit 202 of the power receiving apparatus 20 will be described next with reference to the timing chart in FIG. 15. FIG. 15 is a timing chart indicating signals when an error has occurred while the power receiving apparatus 20 is connected to the power transmission apparatus 10 and a connection based on the USB-PD standard is complete.

In FIG. 15, "VBUS terminal voltage" indicates the voltage value supplied to the VBUS terminal of the connector 201 illustrated in FIG. 13. As indicated in FIG. 15, at the point in time when the timing chart starts, a connection based on the USB-PD standard is complete, and the VBUS terminal voltage is at 20 V.

"CC terminal voltage state" indicates the voltage values of the CC1 terminal and the CC2 terminal of the connector 201 illustrated in FIG. 13. The voltage value is 1.69 V when the power transmission apparatus 10 and the power receiving apparatus 20 are in a connected state and the state is a normal state.

T1301 is the timing at which the detecting unit 208 of the power receiving apparatus 20 detects the error state and outputs a signal indicating the error state to the PD communication control unit 202. The PD communication control unit 202 determines that an error has occurred in response to this signal. This is a timing corresponding to Yes in step S1202 of FIG. 14.

At T1302, the PD communication control unit 202 sends a Hard Reset request command for stopping the USB-PD connection to the power transmission apparatus 10. Reference sign 1301 in FIG. 14 indicates the period in which this command is being sent. T1302 corresponds to the timing of step S1203 in FIG. 14.

T1303 is the timing at which the supply of the VBUS power source is stopped after a predetermined amount of time has passed after the power transmission apparatus 10 received the Hard Reset request command. This corresponds to step S1204 in FIG. 14. According to the USB-PD standard, the stopping of the VBUS supply is started at 25 to 35 msec after receiving the Hard Reset request command. Furthermore, in the present fifth embodiment, T1303 is the timing at which the notification of the error state is started after the VBUS output has been stopped, as indicated by step S1205 in FIG. 14.

T1304 corresponds to step S1206 in FIG. 14. In other words, T1304 is the timing at which the PD communication control unit 202 controls the switch control unit 211 to change the first switching element 209 and the second switching element 210 from the conductive state to the non-conductive state.

Prior to T1304, a voltage divided by the resistance value Rp of the pull-up resistance elements 114 and 115 of the power transmission apparatus 10, and the resistance value Rd of the pull-down resistance elements 204 and 205 of the power receiving apparatus 20, is observed at the CC1 terminal and the CC2 terminal of the connector 201. After T1304, a voltage of 5 V, supplied via the resistances of the pull-up resistance elements 114 and 115, is observed at the CC1 terminal and the CC2 terminal of the connector 201. For example, if Rp is 10 kΩ and Rd is 5.1 kΩ the CC terminal voltage before T1304 is 1.69 V, and is 5 V after T1304. According to the USB Type-C standard, the voltage range required for detecting that the power transmission apparatus 10 has been connected to the power receiving apparatus 20 corresponds to the voltages at the CC terminals being within a range of from 0.85 V to 2.45 V, and from T1304 onward, the voltages are outside this range. Additionally, if the power receiving apparatus 20 is not connected to the power transmission apparatus 10, the 5 V is not supplied, and the CC terminal voltage will drop to a voltage value lower than 5 V through natural discharge. Thus from T1304 on, the PD communication control unit 202 can determine whether the power transmission apparatus 10 and the power receiving apparatus 20 are physically connected, or if the apparatuses have been physically disconnected, by monitoring the voltages at the CC terminals.

With a device compliant with the USB-PD standard, the power receiving apparatus 20 assumes that after the Hard Reset request command is sent (T1302) and VBUS is stopped (T1303). VBUS is restarted within 1 sec. Thus the power receiving apparatus 20 determines that the power transmission apparatus 10 has been disconnected while the VBUS supply is stopped if T1304 can be executed within 1 sec following T1303.

T1305 indicates the timing at which the power transmission apparatus 10 and the power receiving apparatus 20 are physically disconnected, and corresponds to the timing of step S1207 to the determination of Yes in step S1208 of FIG. 14. The 5 V supply is canceled in response to the power transmission apparatus 10 being removed, and thus the voltages at the CC terminals drop to voltages lower than 5 V.

At T1305, the monitoring unit 212 notifies the PD communication control unit 202 that the voltages at the CC terminals have dropped below 4.75 V. In response, the PD communication control unit 202 controls the switch control unit 211 to change the first switching element 209 and the second switching element 210 from the non-conductive state to the conductive state, which corresponds to step S1209 in FIG. 14. Additionally, the PD communication control unit 202 notifies the user of the state change, and the power receiving apparatus 20 returns to its initial state, as indicated by step S1210 in FIG. 12. If the notifying unit 213 is constituted by a light-emitting element such as a light-emitting diode, for example, the light-emitting element is controlled to be lighted when it is necessary to notify the user, and extinguished when the notification is no longer necessary. This makes it possible to notify the user that the state has changed.

According to the present fifth embodiment, when the power transmission apparatus and the power receiving apparatus have deviated from a normal operating state, it is possible to maintain a safe stopped state, as well as suppress the occurrence of a situation where the state repeatedly deviates from a normal operating state.

Figure 11:
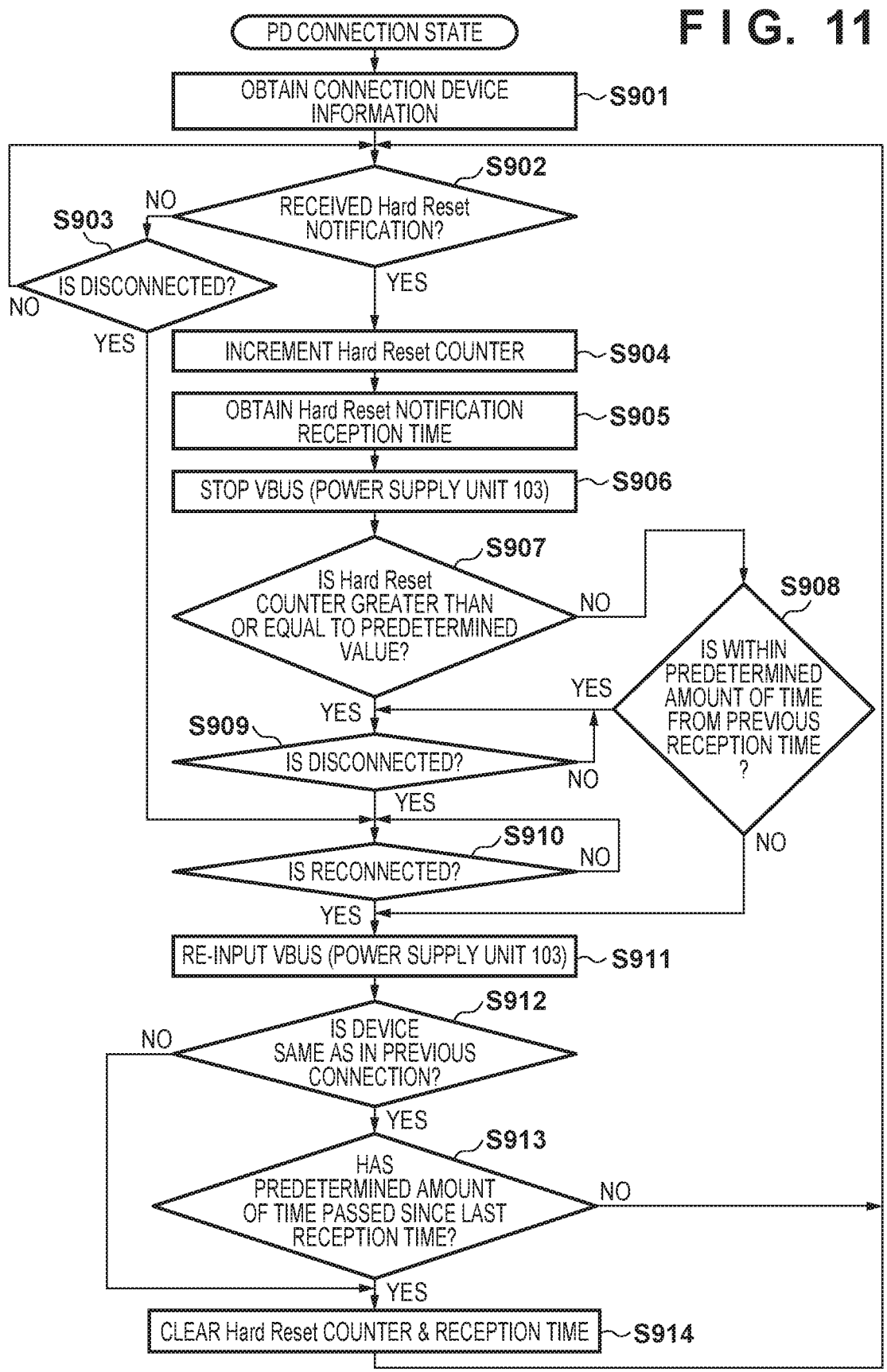
FIG. 11 is a flowchart illustrating a power transmission apparatus-side processing sequence according to a fourth embodiment.

Here, although the power transmission apparatus 10 according to the present fifth embodiment has the configuration illustrated in FIG. 11, the power transmission apparatus 10 may instead have the configurations illustrated in FIGS. 1, 5, or the like.

In the fifth embodiment, the PD communication control unit 202 controls the switch control unit 211 to change the switch elements 209 and 210 from the conductive state to the non-conductive state so that the power transmission apparatus 10 determines that the power receiving apparatus 20 is disconnected. However, the power transmission apparatus 10 determines whether the power receiving apparatus 20 is connected or disconnected by determining whether or not the voltages at the CC1 terminal and the CC2 terminal are within a preset range. Accordingly, the PD communication control unit 202 may keep the CC1 terminal and the CC2 terminal of the connector 201 in a conductive state, and the resistance elements 204 and 205 may be variable resistance elements having resistance values that can be set by the PD communication control unit 202. This can be easily conceptualized as providing the resistance control unit 108, the first variable resistance element 104, and the second variable resistance element 105 of the first embodiment on the power receiving apparatus 20 side (however, both of these variable resistance elements will be used as pull-down elements).

FIG. 17 is a schematic diagram illustrating a power receiving apparatus 200 including a resistance control unit 1708, a first variable resistance element 1704, and a second variable resistance element 1705. The other constituent elements are the same as in the power receiving apparatus 20 illustrated in FIG. 13, and will therefore not be described.

With the power receiving apparatus 200, in step S1206 of FIG. 14, the resistance control unit 1708 controls the first variable resistance element 1704 and the second variable resistance element 1705 so that the voltage level of the CC1 terminal and the CC2 terminal takes on a voltage level outside the voltage range for determining a connection between the devices (from 0.85 to 2.45 V). At the stage where the flow illustrated in FIG. 14 starts, the power transmission apparatus 10 and the power receiving apparatus 20 are in a connected state, and communication and power transfer are carried out according to the USB-PD standard, as described above. In other words, the voltage level of the CC1 terminal and the CC2 terminal is a voltage level within the voltage range (from 0.85 to 2.45 V).

The detecting unit 208 detects an error state if any of the following are detected: a state where the temperature of the VBUS terminal is greater than or equal to a threshold (a temperature error state); a state where the voltage at the VBUS terminal is greater than or equal to a threshold (an overvoltage state); and a state where current flowing in the VBUS terminal is greater than or equal to a threshold (an overcurrent state). If in step S1202 the detecting unit 208 has detected any of the above error states, the resistance control unit 1708 adjusts the resistance value of at least one of the first variable resistance element 1704 and the second variable resistance element 1705. As a result, the voltage level of the CC1 terminal and the CC2 terminal is controlled to a voltage level outside the voltage range for determining a connection between the devices (from 0.85 to 2.45 V). For example, the resistance control unit 1708 reduces the resistance value of the first variable resistance element 1704, and controls the voltage level of the CC1 terminal to a voltage level lower than the voltage range for determining a connection between the devices. Alternatively, the resistance control unit 1708 increases the resistance value of the first variable resistance element 1704, and controls the voltage level of the CC1 terminal to a voltage level higher than the voltage range for determining a connection between the devices.

Although preferred embodiments of the present invention have been described above, the present invention is not intended to be limited to these embodiments, and many variations and alterations are possible within the scope thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125280, filed Jun. 29, 2018, which is hereby incorporated by reference herein in its entirety.

What is claimed is:

1. An electronic device comprising:
  an interface including a first terminal configured to receive power from an external device and a second terminal configured to communicate with the external device; and
  at least one processor and/or at least one circuit to perform the operations of the following units:
  a communication unit that communicates with the external device via the second terminal; and
  a control unit that controls a connection between the second terminal and a ground,
  wherein in a case that a state of power received via the first terminal is a predetermined state, the communication unit sends a reset request for stopping the supply of power to the external device and the control unit controls the connection between the second terminal and the ground from a connected state to a disconnected state after sending the reset request.

2. The electronic device according to claim 1, further comprising:
  a detecting unit that detects the state,
  wherein the predetermined state is at least one of the state of the power received via the first terminal being an overcurrent state and an overvoltage state.

3. The electronic device according to claim 1,
  wherein the interface is an interface connector compliant with the USB 3.0 Power Delivery standard;
  the first terminal is a VBUS terminal; and
  the second terminal is a CC terminal.

4. The electronic device according to claim 1,
wherein in a case that a temperature of the first terminal is greater than or equal to a predetermined temperature, the control unit controls the connection between the second terminal and the ground from the disconnected state to the connected state.

5. The electronic device according to claim 1, further comprising:
a detecting unit that detects a voltage at the second terminal,
wherein in a case that the voltage at the second terminal has become less than or equal to a threshold after the second terminal and the ground have been changed from the connected state to the disconnected state, the control unit controls the connection between the second terminal and the ground from the connected state to the disconnected state.

6. A method of controlling an electronic device, wherein the electronic device comprises:
an interface including a first terminal configured to receive power from an external device and a second terminal configured to communicate with the external device; and
the method comprises:
communicating with the external device via the second terminal; and
controlling a connection between the second terminal and a ground, and
wherein in the communicating, in a case that a state of power received via the first terminal is a predetermined state, a reset request for stopping the supply of power is sent to the external device; and
in the controlling, the connection between the second terminal and the ground is controlled from a connected state to a disconnected state after sending the reset request.

7. A non-transitory computer-readable storage medium storing a program which, when read and executed by a processor in an electric device including an interface having a first terminal for receiving power from an external device and a second terminal for communicating with the external device, causes the computer to execute the steps of a method comprising:
communicating with the external device via the second terminal; and
controlling a connection between the second terminal and a ground, and
wherein in the communicating, in a case that a state of power received via the first terminal is a predetermined state, a reset request for stopping the supply of power is sent to the external device and, in the controlling, the connection between the second terminal and the ground is controlled from a connected state to a disconnected state after sending the reset request.

* * * * *